(12) United States Patent
Mitani et al.

(10) Patent No.: US 8,363,095 B2
(45) Date of Patent: Jan. 29, 2013

(54) VIDEO SYSTEM AND DISPLAY DEVICE AND EYEGLASS DEVICE USED IN SAME

(75) Inventors: Hiroshi Mitani, Osaka (JP); Kazuhiro Mihara, Osaka (JP); Shuji Inoue, Okayama (JP); Masanobu Inoe, Okayama (JP); Seiji Nakazawa, Osaka (JP); Katsuo Saigo, Hyogo (JP)

(73) Assignee: Panasonic Corporation, Osaka (JP)

( * ) Notice: Subject to any disclaimer, the term of this patent is extended or adjusted under 35 U.S.C. 154(b) by 662 days.

(21) Appl. No.: 12/627,458

(22) Filed: Nov. 30, 2009

(65) Prior Publication Data

US 2010/0328533 A1 Dec. 30, 2010

Related U.S. Application Data

(60) Provisional application No. 61/220,883, filed on Jun. 26, 2009.

(30) Foreign Application Priority Data

Jul. 1, 2009 (JP) .................................. 2009-156697

(51) Int. Cl.
*H04N 13/02* (2006.01)
(52) U.S. Cl. ........................................... 348/56; 348/51
(58) Field of Classification Search .................... 348/51, 348/56
See application file for complete search history.

(56) References Cited

U.S. PATENT DOCUMENTS

2009/0109282 A1* 4/2009 Schnebly et al. ............... 348/55

FOREIGN PATENT DOCUMENTS

| JP | 63-214096 | 9/1988 |
| JP | 64-73891 | 3/1989 |
| JP | 4-159895 | 6/1992 |
| JP | 11-98538 | 4/1999 |
| JP | 2000-36969 | 2/2000 |

* cited by examiner

*Primary Examiner* — Sath V Perungavoor
*Assistant Examiner* — Jeffery Williams
(74) *Attorney, Agent, or Firm* — Wenderoth, Lind & Ponack, L.L.P.

(57) ABSTRACT

The present invention discloses a video system provided with a display device for displaying a video image including a first video image and a second video image and an eyeglass device for assisting a viewer in viewing the video image, wherein the display device includes: a display for displaying the first and second video images; a first generator for generating a synchronizing signal in synchronization with the first video image; and a transmitter for transmitting the synchronizing signal to the eyeglass device, and the eyeglass device includes: a receiver for receiving the synchronizing signal; a second generator for generating an internal signal in synchronization with the second video image, based on the synchronizing signal; an optical filter portion for adjusting amounts of incident light to left and right eyes, respectively; and a controller for controlling the optical filter portion based on the internal signal.

18 Claims, 22 Drawing Sheets

FIG. 1
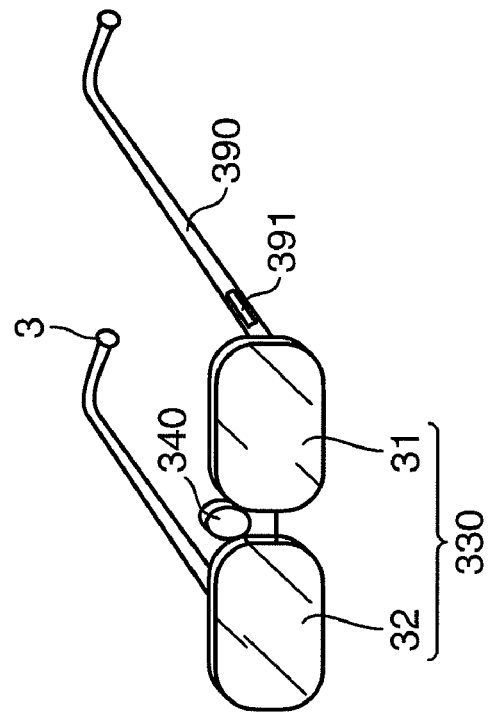
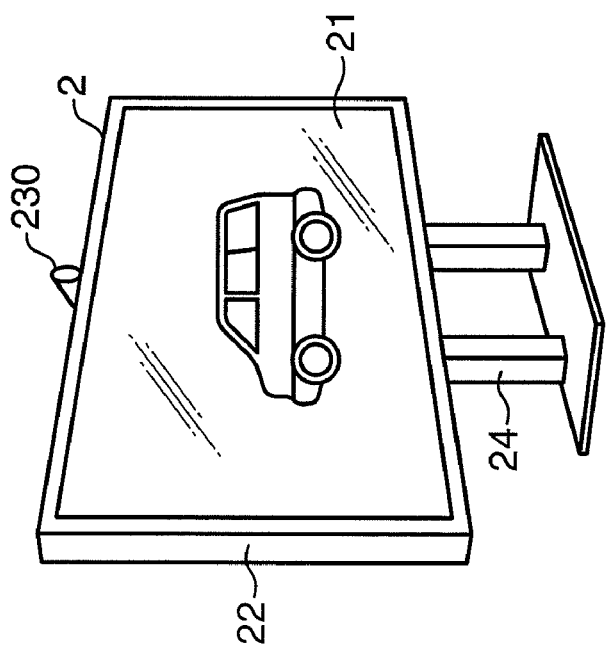

FIG. 14

| TYPE OF SIGNAL WAVEFORM | OPTICAL FILTER UNIT OPENING TIME |
|---|---|
| FIRST SIGNAL WAVEFORM | PRESCRIBED TIME X |
| SECOND SIGNAL WAVEFORM | +10us |
| THIRD SIGNAL WAVEFORM | +50us |
| FOURTH SIGNAL WAVEFORM | +100us |
| ⋮ | ⋮ |
| NTH SIGNAL WAVEFORM | +1ms |

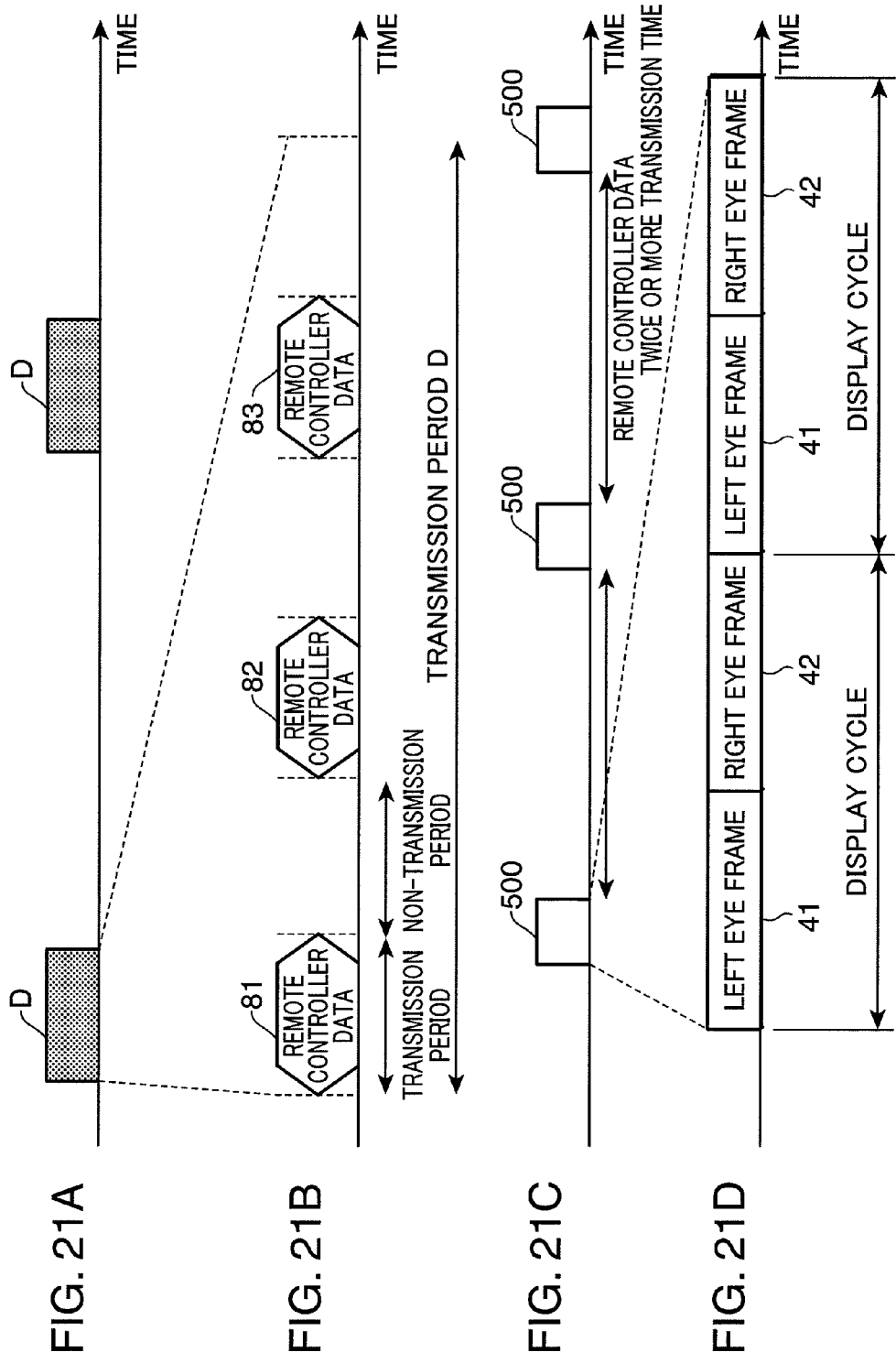

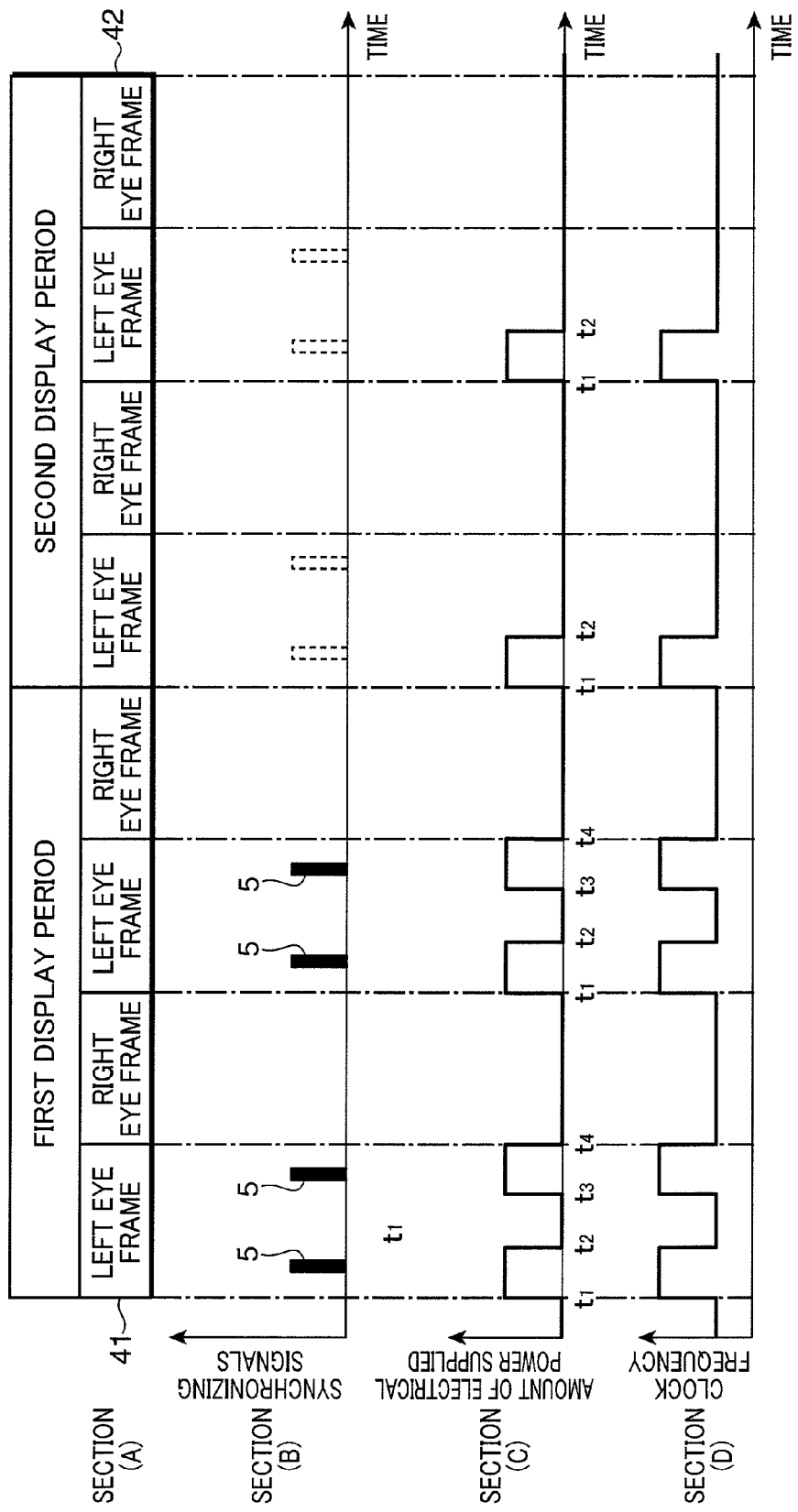

VIDEO SYSTEM AND DISPLAY DEVICE AND EYEGLASS DEVICE USED IN SAME

This application is based on U.S. Provisional Application No. 61/220,883 filed on Jun. 26, 2009 and Japanese Patent Application No. 2009-156697 filed in Jul. 1, 2009, the contents of which are hereby incorporated by reference.

BACKGROUND OF THE INVENTION

1. Field of the Invention

The present invention relates to a technology allowing a viewer to view a video image displayed on a display device through an eyeglass device. More particularly, the present invention relates to a technology with the eyeglass device to switchingly provide the video image on a display for a viewer.

2. Description of the Background Art

Video systems provided with a display device configured to display a video image and an eyeglass device configured to assist a viewer in viewing the video image displayed on the display device are used, for example, to provide a three-dimensional image. Exemplary video systems are disclosed in Japanese Patent Application Laid-open No. H11-98538 and Japanese Patent Application Laid-open No. 2000-36969.

Japanese Patent Application Laid-open Nos. H11-98538 and 2000-36969 disclose technologies for communication between a display device and an eyeglass device. Japanese Patent Application Laid-open No. H11-98538 discloses a technology resolving a problem on a temporal interruption in communication between the display device and the eyeglass device. The eyeglass device disclosed in Japanese Patent Application Laid-open No. H11-98538 generates an internal signal based on a signal from the display device that represents switching of video frames. The eyeglass device controls opening and closing of liquid crystal shutters based on the generated internal signal. As a result, the liquid crystal shutters are favorably controlled even if there is a temporal failure in the signal communication. Thus, a problem resulting from the temporal failure in the signal communication (such as failure to provide a three-dimensional image for a viewer or image flickering) can be reduced. In addition, the eyeglass device disclosed in Japanese Patent Application Laid-open No. H11-98538 is configured to control the liquid crystal shutters using a signal having a plurality of clocks that indicate switching between a video image for the left eye and a video image for the right eye.

Japanese Patent Application Laid-open No. 2000-36969 proposes switching between opening and closing of left and right shutters of an eyeglass device during a non-display period in a subfield. According to the technology disclosed in Japanese Patent Application Laid-open No. 2000-36969, a viewer may view three-dimensional images even if the viewer uses an eyeglass device with so slow response rate that switching of shutter between opening and closing at the same time as a beginning of a subfield may result in blocking light from a plasma display panel (PDP).

The eyeglass devices disclosed in Japanese Patent Application Laid-open Nos. H11-98538 and 2000-36969 require a reception of a synchronizing signal from the display device every switching between a left shutter and a right shutter. This also means that the display device has to transmit the synchronizing signal every opening and closing of the shutters in the eyeglass device. Thus there is a drawback in a highly frequent communication of the synchronizing signal between the display device and the eyeglass device. The highly frequent communication of the synchronizing signal may make a control of the eyeglass device and/or the display device more complicated. Alternatively, the highly frequent communication of the synchronizing signal may also increase a potential interference between the video system and other equipment.

SUMMARY OF THE INVENTION

With the foregoing in view, an object of the present invention is to provide a video system, display device and eyeglass device to provide a preferable view of a video image for a viewer with more simplified communication of a synchronizing signal.

A video system according to one aspect of the present invention is provided with a display device configured to display a video image including a first video image and a second video image and an eyeglass device configured to assist a viewer in viewing the video image, wherein the display device includes: a display portion configured to display the first video image and the second video image in a prescribed order; a first generation portion configured to generate a synchronizing signal in synchronization with the first video image; and a transmission portion configured to transmit the synchronizing signal to the eyeglass device, and the eyeglass device includes: a reception portion configured to receive the synchronizing signal; a second generation portion configured to generate an internal signal in synchronization with the second video image, based on the synchronizing signal; an optical filter portion configured to adjust amounts of incident light to a left eye and a right eye, respectively; and a control portion configured to control the optical filter portion based on the internal signal.

A display device according to another aspect of the present invention is provided with a display portion configured to display a first video image and a second video image in a prescribed order for a prescribed period; a first generation portion configured to generate a synchronizing signal in synchronization with the first video image; and a transmission portion configured to transmit the synchronizing signal, wherein the transmission portion transmits only the synchronizing signal in synchronization with the first video image during at least a portion of the prescribed period.

An eyeglass device according to yet another aspect of the present invention is provided with a reception portion configured to receive a synchronizing signal in synchronization with a first video image while the first video image and a second video image are displayed in a prescribed order; a second generation portion configured to generate an internal signal in synchronization with the second video image based on the synchronizing signal; an optical filter portion configured to adjust amounts of incident light to left and right eyes of a viewer, respectively; and a control portion configured to control the optical filter portion based on the internal signal.

BRIEF DESCRIPTION OF THE DRAWINGS

FIG. 1 is a schematic block diagram of a video system according to an embodiment of the present invention;

FIG. 14 shows control information transmitted with the synchronizing signal shown in FIG. 13;

FIG. 21 shows intermittent transmission of the synchronizing signal from the display device shown in FIG. 1; and FIG. 22 shows power supply control during the intermittent transmission of the synchronizing signal shown in FIG. 21.

DETAILED DESCRIPTION OF THE PREFERRED EMBODIMENTS OF THE INVENTION

Figure 2:
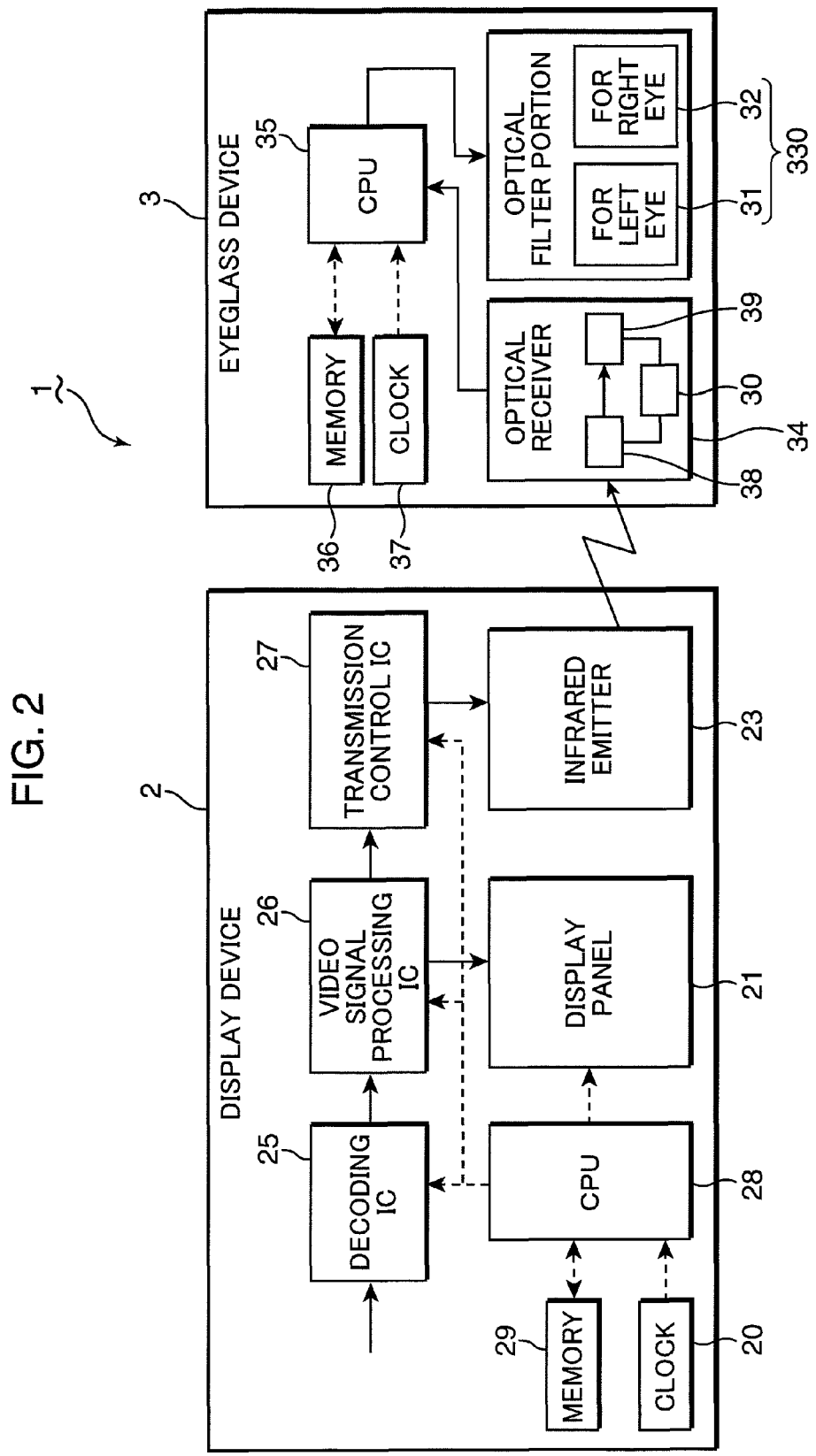
FIG. 2 shows a hardware configuration of a display device and an eyeglass device used in the video system shown in FIG. 1.

A video system according to an embodiment of the present invention is described below with reference to the accompanying drawings. It should be noted that the present invention is not limited to configurations, arrangements or forms and the like shown in the drawings as well as descriptions along with them, which are merely intended to facilitate to understand a principle of the present invention.

First Embodiment

<1. Video System Configuration>

FIG. 1 is a schematic block diagram of a video system according to a first embodiment. The video system 1 comprises a display device 2 and an eyeglass device 3. The viewer wearing the eyeglass device 3 may view the video image displayed on the display device 2. In the present embodiment, the display device 2 displays the video image configured to be three-dimensionally perceived. The viewer wearing the eyeglass device 3 in viewing the video image displayed in the display device 2 three-dimensionally perceives it.

The display device 2 comprises a substantially rectangular display panel 21, a frame 22 surrounding the display panel 21, a transmitter 230 attached to the top of the frame 22, and a leg 24 configured to support the frame 22. The display panel 21 is used as a display portion configured to alternately display (at a frequency of 120 Hz, for example) a video frame to be viewed with the left eye and a video frame to be viewed with the right eye. A synchronizing signal used for synchronizing operation of the eyeglass device 3 with the display of the video image on the display device 2 is transmitted from the transmitter 230 to the eyeglass device 3. It should be noted that the video image to be viewed with the left eye is explained as a first video image and the video image to be viewed with the right eye is explained as a second video image in the present embodiment, but the present invention is not limited thereto. Alternatively the video image to be viewed with the right eye may be designated as the first video image while the video image to be viewed with the left eye may be designated as the second video image. It also should be noted that a video frame for the left eye (to be referred to as "a left eye frame") and a video frame for the right eye (to be referred to as "a right eye frame") are alternately displayed in the present embodiment, but the present invention is not limited thereto. Alternatively these frames may also be displayed in a prescribed order.

The eyeglass device 3 substantially looks like a pair of vision corrective eyeglasses. The eyeglass device 3 is provided with an optical filter portion 330 comprising a left eye filter 31 and a right eye filter 32. A receiver 340 configured to receive the synchronizing signal from the transmitter 230 is attached between the left eye filter 31 and the right eye filter 32.

As aforementioned, the display device 2 outputs the video image to the display panel 21 after the video image is subjected to a prescribed processing (such as three-dimensional image processing: 3D image processing). The transmitter 230 of the display device 2 transmits a signal (synchronizing signal) in synchronization with the video image output to the display panel 21. The receiver 340 of the eyeglass device 3 receives the synchronizing signal. The eyeglass device 3 performs a prescribed optical processing on incident light to the left and right eyes of a viewer based on the synchronizing signal. The left and right optical filters 31 and 32 may open and close in synchronization with the synchronizing signal from the transmitter 230 as a typical optical processing. While the left eye frame is displayed on the display panel 21 of the display device 2, the left eye filter 31 opens so as to increase an amount of a light passing through the left eye filter 31 of the eyeglass device 3 as the right eye filter 32 closes so as to decrease an amount of a light passing through the right eye filter 32. While the right eye frame is displayed on the display panel 21 of the display device 2, the left eye filter 31 closes so as to decrease the amount of the light passing through the left eye filter 31 of the eyeglass device 3 as the right eye filter 32 opens so as to increase the amount of the light passing through the right eye filter 32. Thus the eyeglass device 3 adjusts the amounts of the light passing through the left eye filter 31 and the right eye filter 32 in synchronization with the video image output to the display panel 21 by controlling the optical filter portion 330. It should be noted that the term "opening left eye filter 31/right eye filter 32" along with terms analogous thereto used in the following descriptions refer to any operation of the left eye filter 31 or the right eye filter 32 for increasing the amounts of the light passing through them. The term "closing left eye filter 31/right eye filter 32" along with terms analogous thereto used in the following descriptions refer to any operation of the left eye filter 31 or the right eye filter 32 for decreasing the amounts of the light passing through them.

As aforementioned, in the present embodiment, the left eye frame (left eye image) displayed on the display device 2 contains different contents from the right eye frame (right eye image) by an amount of parallax so that the video system 1 causes a viewer to three-dimensionally perceive the displayed images. The above-mentioned control of the optical filter portion 330, through which the viewer wearing the eyeglass device 3 views the left eye frame (left eye image) with the left eye and views the right eye frame (right eye image) with the right eye, provides pseudo-parallax that causes the viewer to three-dimensionally perceive the video image displayed by the display device 2. The frame frequency in displaying the left eye frame and the right eye frame in the present embodiment is 120 Hz although the present invention is not limited thereto. Alternatively other frame frequencies such as 96 Hz, 100 Hz, 144 Hz may also be applicable. Further alternatively, the frame frequency may be changed/adjusted corresponding to a type of the video image displayed.

FIG. 2 shows a hardware configuration of the display device 2 and the eyeglass device 3. It should be noted that the present invention is not limited to the hardware configuration shown in FIG. 2, which is merely intended to be exemplary.

The display device 2 comprises a decoding IC 25, a video signal processing IC 26, a transmission control IC 27, a CPU 28, a memory 29, a clock 20, the above-mentioned display panel 21 and an infrared emitter 23 used as the above-mentioned transmitter 230.

An encoded video signal is input to the decoding IC 25 which decodes the input video signal and outputs image data in a prescribed format. The applicable image decoding formats may include MPEG (Motion Picture Experts Group)-2, MPEG-4 and H264, for example.

The video signal processing IC 26 processes a video signal for displaying video image data from the decoding IC 25 as a three-dimensional image. For example, the video signal processing IC 26 detects a left eye image and a right eye image from the video image decoded by the decoding IC 25. Subsequently, the video signal processing IC 26 alternately rearranges these images. Alternatively, the video signal processing IC 26 may automatically generate images for the left eye and the right eye from the video image output by the decoding IC 25. Subsequently, the video signal processing IC 26 converts these images to signals compatible with the display panel 21. In this manner, the video signal processing IC 26 carries out the signal processing required to display the three-dimensional image while also generating the output signals compatible with the input method of the display panel 21.

The video signal processing IC 26 may also execute a signal processing other than the signal processing required for displaying the three-dimensional image. For example, the video signal processing IC 26 may carry out processing for adjusting colors of the video image to be displayed corresponding to characteristics of the display panel 21. Alternatively, the video signal processing IC 26 may also interpolate images between image frames generated with the decoding IC 25 to increase an image frame rate.

The transmission control IC 27 generates a synchronizing signal in synchronization with the video image for the left and right eyes generated by the video signal processing IC 26. Subsequently, the transmission control IC 27 outputs the generated synchronizing signal to the infrared emitter 23.

The CPU 28 controls the entire display device 2 in accordance with a program recorded in the memory 29 and/or an external input (not shown) (by controlling elements such as the decoding IC 25 and the video signal processing IC 26 in the display device 2, for example).

The memory 29 is used as a region configured to record the program executed by the CPU 28 along with primary data generated during the course of the program execution. A volatile random access memory (RAM) or a non-volatile read only memory (ROM) may be used as the memory 29.

The clock 20 generates and supplies a clock signal serving as an operating reference for each IC to the CPU and other elements.

The display panel 21 displays the signal output from the video signal processing IC 26. A conventional CRT, LCD using a liquid crystal element, PDP, organic electroluminescence (EL) or other type of display method may be used for the display panel 21.

The infrared emitter 207 outputs the synchronizing signal to the outside (eyeglass device 3) with an infrared light under the control of the transmission control IC 27.

It should be noted that the present invention is not limited to the infrared light which in the present embodiment is used to establish synchronization between the display device 2 and the eyeglass device 3. The synchronization between the display device 2 and the eyeglass device 3 may also be established using wired signals, radio signals, signals using ultrasonic waves or any other transmission methods.

The eyeglass device 3 comprises a CPU 35, a memory 36, a clock 37, the above-mentioned optical filter portion 330 and an optical receiver 34 used as the above-mentioned receiver 340.

The CPU 35 controls the entire eyeglass device 3 in accordance with a program recorded in the memory 36 and/or an external input (not shown). A peripheral interface controller (PIC)® or H8 Microcomputer®, for example, may be preferably used for the CPU 35.

The memory 36 is used as a region for storing data of the program executed by the CPU 35 and primary data generated during the course of the program execution. A volatile random access memory (RAM) or a non-volatile read only memory (ROM) may be used for the memory 36.

The clock 37 generates a clock signal that serves as an operating reference for each element in the eyeglass device 3, and provides the clock signal to each element of the eyeglass device 3. The clock signal may be divided or multiplied as necessary.

The optical receiver 34 receives the synchronizing signal transmitted from the infrared emitter 23 of the display device 2. The optical receiver 34 includes an infrared radiation (IR) sensor 38, an operational amplifier 39 and a power supply circuit 30. The IR sensor 38 generates an electrical signal when receiving the infrared light transmitted from the infrared emitter 23. The operational amplifier 39 amplifies the electrical signal received from the IR sensor 38. The power supply circuit 30 supplies electrical power from a power source (such as a lithium ion battery) installed in the eyeglass device 3 or interrupts the electrical power supply to the IR sensor 38 and the operational amplifier 39 under the control of the CPU 35.

Although the infrared light is used for communication of the synchronizing signal in the present embodiment, in the case a radio signal is used, an element such as an antenna or a tuner capable of receiving the radio signal may be used instead of the IR sensor 38, so that synchronization using the radio signal between the display device 2 and the eyeglass device 3 may be preferably established.

The optical filter portion 330 comprises the left eye filter 31 and the right eye filter 32 as afore-described. The left eye filter 31 and the right eye filter 32 are attached to the eyeglass device 3 so that the left eye filter 31 is arranged in front of the left eye of a viewer wearing the eyeglass device 3 while the right eye filter 32 is arranged in front of the right eye. The left eye filter 31 adjusts an amount of an incident light to the left eye of the viewer while the right eye filter 32 adjusts an amount of an incident light to the right eye of the viewer. The optical filter portion 330 suitably adjusts the amounts of the incidents light to the left and right eyes under the control of the CPU 35, respectively, thereby providing a desirable optical effect for the viewer wearing the eyeglass device 3.

It should be noted that the present invention is not limited to the hardware configuration shown in FIG. 2 in the present embodiment. For example, instead of a plurality of ICs such as the decoding IC 25 and the video signal processing IC 26 shown in FIG. 2, these ICs may be integrated into a single IC. In addition, the program processing executed by the CPU according to the present embodiment may be alternatively executed by a programmable logic device (PLD) or a digital signal processor (DSP).

It also should be noted that the present invention is not limited to the display device 2 with the infrared emitter 23 according to the present embodiment. For example, a synchronizing signal transmission device, in which the transmission control IC 27 and the infrared emitter 23 are incorporated, may be provided separately from the display device 2. In this case, the synchronizing signal transmission device outputs the synchronizing signal to the eyeglass device 3 in accordance with information input from the display device 2.

Figure 3:
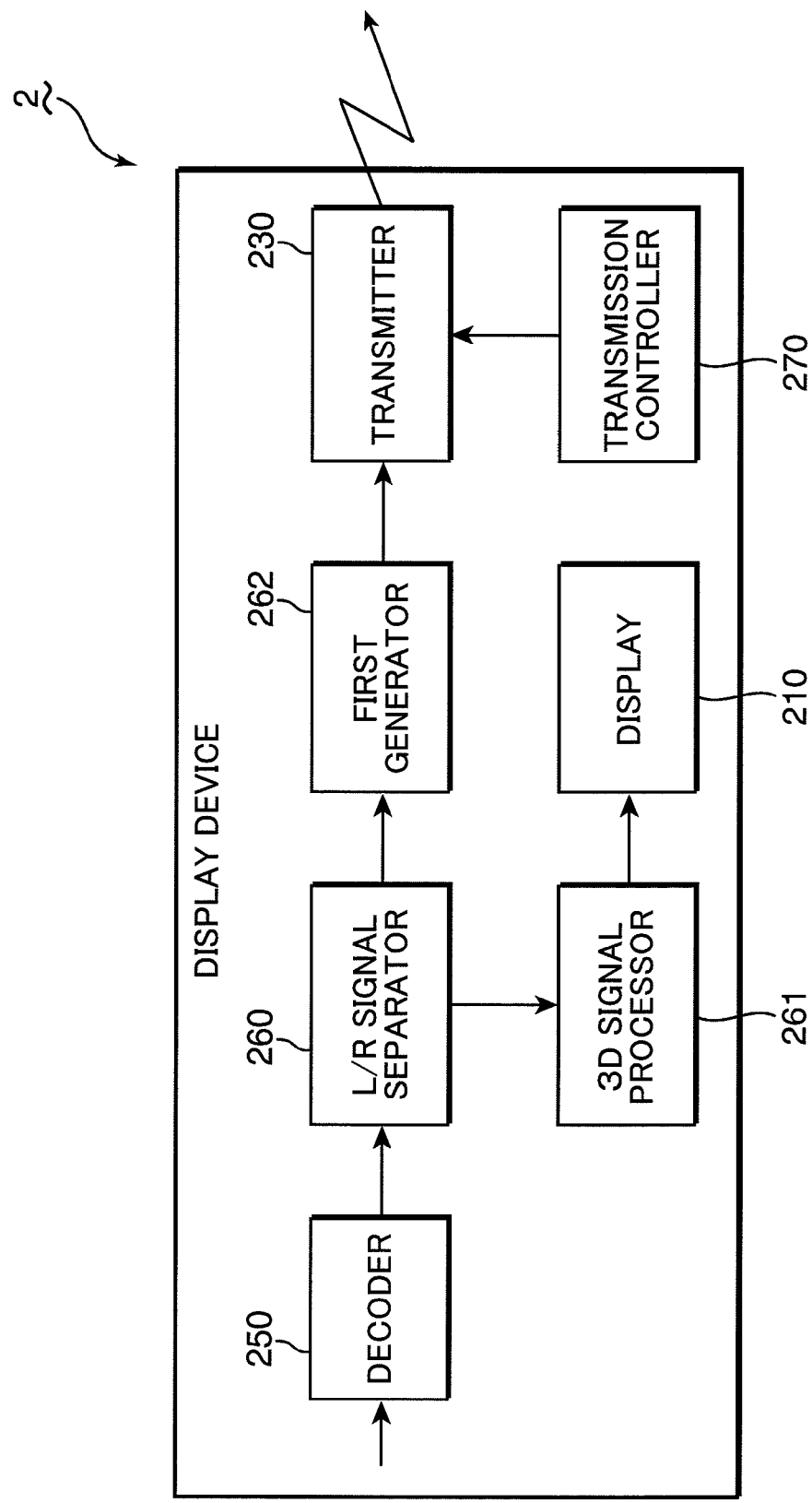
FIG. 3 is a functional block diagram of the display device used in the video system shown in FIG. 1.

FIG. 3 shows a functional configuration of the display device 2. It should be noted that the present invention is not limited to the functional configuration shown in FIG. 3, which is merely intended to be exemplary.

The display device 2 includes a decoder 250, an L/R signal separator 260, a 3D signal processor 261, a first generator 262, a display 210, a transmitter 230 and a transmission controller 270.

Encoded video signal is input to the decoder 250 which decodes the input video signal. The decoder 250 corresponds to the decoding IC 25 in the hardware configuration shown in FIG. 2.

The L/R signal separator 260 separates the video signal decoded by the decoder 250 into video signals for the left eye and the right eye or generates video signals for the left eye and the right eye from the video signal decoded by the decoder 250.

The 3D signal processor 261 adjusts the video signals for the left eye and the right eye separated by the L/R signal separator 260, for example, corresponding to characteristics of the display 210 configured to display the video image. The 3D signal processor 261 may adjust the parallax between the left eye image and the right eye image, for example, corresponding to a size of the display panel 21 (see FIG. 1) used as the display 210.

The first generator 262 generates synchronizing signals that are synchronous with the video images for the left eye and the right eye generated by the L/R signal separator 260, respectively. During the course of the synchronizing signal generation, the first generator 262 may also adjust a type of the synchronizing signal or timing of their generation according to characteristics of the display panel 21 used as the display 210.

The L/R signal separator 260, the 3D signal processor 261 and the first generator 262 corresponds to the video signal processing IC 26 in the hardware configuration shown in FIG. 2.

The display 210 corresponds to the display panel 21 described in the context of FIGS. 1 and 2. The display 210 displays the video signal processed by the 3D signal processor 261 in the form of the video image.

The transmitter 230 corresponds to the infrared emitter 23 described in the context of FIG. 2. The transmitter 230 transmits the synchronizing signal generated by the first generator 262 to the outside (eyeglass device 3 (see FIGS. 1 and 2)) under the control of the transmission controller 270.

The transmission controller 270 controls a data volume of the transmitted synchronizing signal while also controlling the transmission interval between synchronizing signal groups comprising a plurality of the synchronizing signals as necessary so that the transmitter 230 intermittently transmits the synchronizing signal groups. The transmission controller 270 corresponds to the transmission control IC 27 in the hardware configuration shown in FIG. 2.

Figure 4:
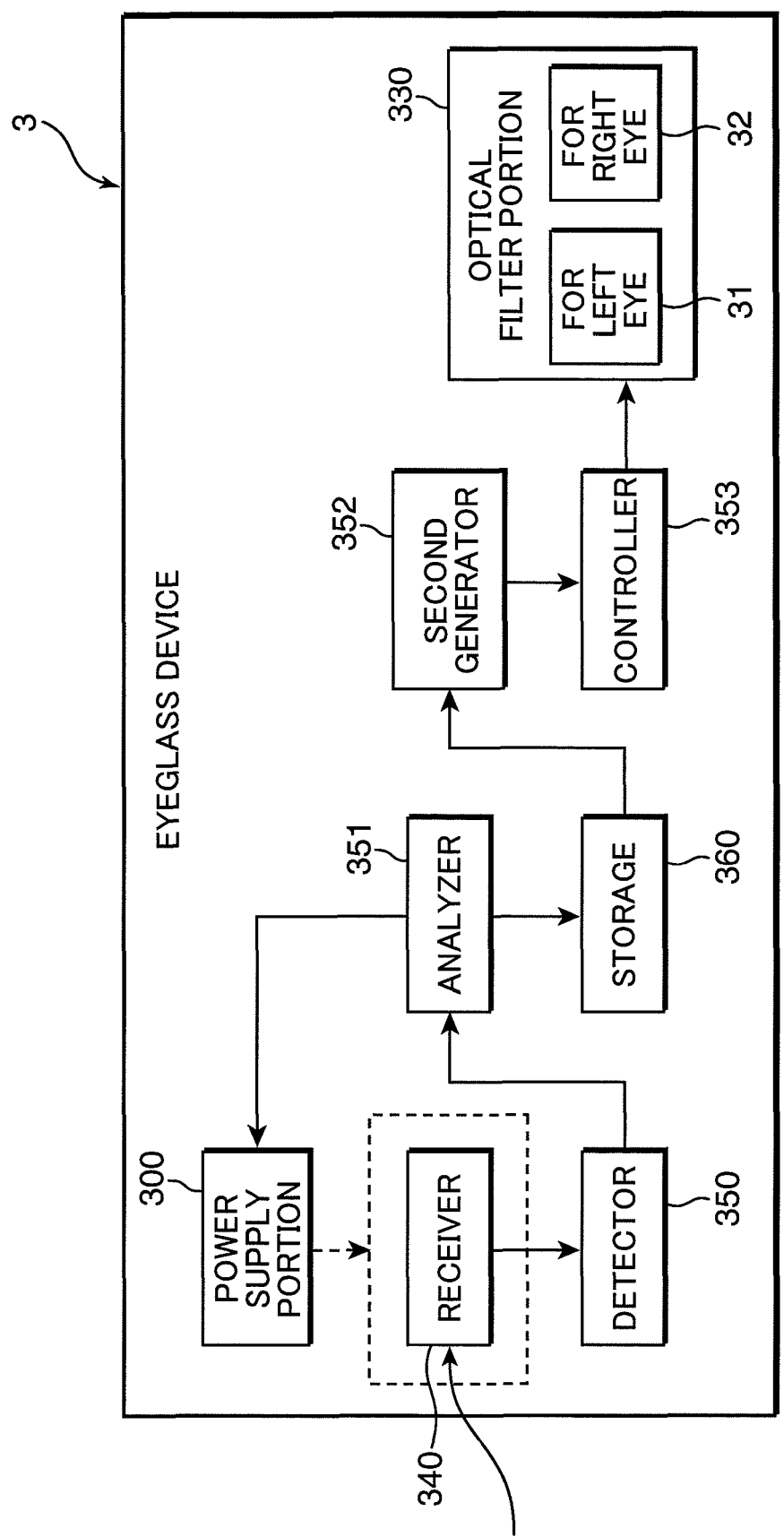
FIG. 4 is a functional block diagram of the eyeglass device used in the video system shown in FIG. 1.

FIG. 4 shows a functional configuration of the eyeglass device 3. The functional configuration of the eyeglass device 3 is described with reference to FIG. 3 together with FIG. 4. It should be noted that the present invention is not limited to the functional configuration shown in FIG. 4, which is merely intended to be exemplary.

The eyeglass device 3 comprises a receiver 340, a detector 350, an analyzer 351, a storage 360, a second generator 352, a controller 353, an optical filter portion 330 and a power supply portion 300.

The receiver 340 receives the synchronizing signal transmitted with the infrared light from the display device 2. The receiver 340 outputs an electrical signal corresponding to the received infrared light to the detector 350. The receiver 340 corresponds to the IR sensor 38 and the operational amplifier 39 of the optical receiver 34 in the hardware configuration shown in FIG. 2. It should be noted that the present invention is not limited to the infrared light for the communication of the synchronizing signal in the present embodiment as aforementioned. Alternatively any communication technology such as wireless communication may also be used for the communication of the synchronizing signal.

The detector 350 detects the electrical signal generated from the infrared light received by the receiver 340 as the synchronizing signal. For example, a signal with a specific electrical waveform may be detected as the synchronizing signal.

The analyzer 351, for example, analyzes information on a time interval (such as a time interval between timings of opening and closing the left eye filter 31 and the right eye filter 32) for operating the optical filter portion 330 based on the synchronizing signal detected by the detector 350. The analyzer 351 may further transmit a command to the power supply portion 300 as to whether or not power is to be supplied to the receiver 340 based on the analysis result.

The detector 350 and the analyzer 351 correspond to a portion of the program executed by the CPU 35 in the hardware configuration shown in FIG. 2.

As aforementioned, the analyzer 351 analyzes control information relating to operation of the optical filter portion 330 based on the synchronizing signal. The storage 360 records and retains the analyzed control information. The storage 360 corresponds to the memory 36 in the hardware configuration shown in FIG. 2. The CPU 35 stores the control information in the memory 36.

The second generator 352 generates an internal signal (an internal synchronizing signal) within the eyeglass device 3 based on the synchronizing information recorded in the storage 360 or the synchronizing information (time interval information) analyzed by the analyzer 351. The second generator 352 corresponds to the CPU 35 and the clock 37 in the hardware configuration shown in FIG. 2.

The controller 353 controls operation of the optical filter portion 330 in accordance with the internal signal generated by the second generator 352. For example, the left eye filter 31 and the right eye filter 32 of the optical filter portion 330 adjust the amount of the transmitted light under control from the controller 353. The controller 353 corresponds to the program executed by the CPU 35 (program for controlling the optical filter portion 330) or a drive circuit configured to drive the optical filter portion 330, in the hardware configuration shown in FIG. 2.

As aforementioned, the optical filter portion 330 comprises the left eye filter 31 and the right eye filter 32. The left eye filter 31 and the right eye filter 32 adjust the amount of the transmitted light. For example, the left eye filter 31 and the right eye filter 32 adjust the amount or the polarization of the transmitted light. A liquid crystal element, for example, may be used for the left eye filter 31 and the right eye filter 32. The amount of the light passing through the left eye filter 31 and the right eye filter 32, respectively, is adjusted under control for the liquid crystal elements.

In the present embodiment, the left eye image and the right eye image are alternately switched in display panel 21 by the display device 2. Therefore the left eye filter 31 and the right eye filter 32 may work as shutters configured to alternatively increase and/or decrease the amount of the transmitted light although the present invention is not limited thereto. Alternatively the left eye filter 31 and the right eye filter 32 may also operate so as to change polarization direction of the transmitted light. Further alternatively, the left eye filter 31 and the right eye filter 32 may also carry out another operation for adjustment of the amounts of the light passing through the left eye filter 31 and the right eye filter 32 in synchronization with the video image displayed by the display device 2.

The power supply portion 300 receives a command from the analyzer 351 as described above. The power supply portion 300 supplies power to the receiver 340 or interrupts the power supply according to the command from the analyzer 351. The power supply portion 300 corresponds to the power supply circuit 30 of the optical receiver 34 in the hardware configuration shown in FIG. 2.

It should be noted that the present invention is not limited to the functional configurations shown in FIGS. 3 and 4 described according to the present embodiment in which the transmitter 230 and the display 210 are shown incorporated within a single display device 2. Alternatively the transmitter 230 may be incorporated in some device different from the display device 2.

It should be noted that the present invention is not limited to the exemplary relationship between the hardware configuration and the function configuration described in the context of FIGS. 2 through 4. It should be understood that any other hardware configuration and/or functional configuration may be applicable.

<2. Control of Optical Filter Portion Based on Synchronizing Signal>

Figure 5:
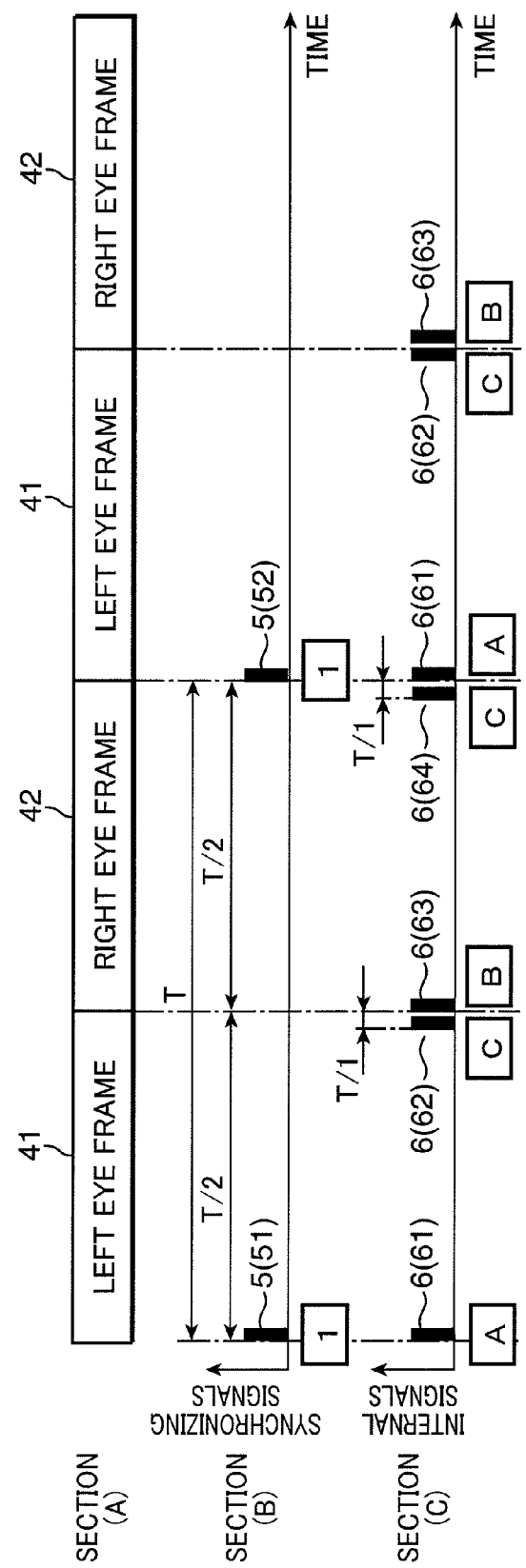
FIG. 5 shows transmission of a synchronizing signal from the display device shown in FIG. 1 and generation of an internal signal based on the synchronizing signal.

FIG. 5 shows transmission of the synchronizing signal from the display device 2 and generation of the internal signal by the eyeglass device 3 as described in the context of FIGS. 1 to 4. The transmission of the synchronizing signal from the display device 2 and the generation of the internal signal by the eyeglass device 3 are described with reference to FIGS. 3 and 4 together with FIG. 5.

Section (A) of FIG. 5 shows that the display 210 of the display device 2 is alternately displaying a left eye frame 41 and a right eye frame 42 sequentially. Section (B) shows that the transmitter 230 of the display device 2 transmits the synchronizing signal 5 in synchronization with a frame displayed by the display 210. Section (C) shows the internal signal 6 generated by the eyeglass device 3 based on the synchronizing signal 5 from the display device 2.

The display device 2 generates and transmits the synchronizing signal 5 in synchronization with the video image displayed by the display 210. The L/R signal separator 260 separates the video signal decoded by the decoder 250 into the video signals of the left frame 41 and the right frame 42. Subsequently, the L/R signal separator 260 adjusts the separated video signals according to the display method of the display 210. For example, the L/R signal separator 260 rearranges the corresponding left eye frame 41 and right eye frame 42 using the video signal decoded by the decoder 250 so as to allow the display 210 to alternately display the left eye frame 41 and the right eye frame 42. For example, as shown in section (A) of FIG. 5, the L/R signal separator 260 rearranges the left eye frame 41 and the right eye frame 42 so that the left eye frame 41 is displayed prior to the right eye frame 42.

The first generator 262 generates the synchronizing signals 5 corresponding to the rearranged order of the left and right frames 41 and 42 by the L/R signal separator 260. Section (B) of FIG. 5 shows the synchronizing signal 5 generated by the first generator 262.

As shown in section (B), the synchronizing signal 5 is generated and transmitted according to the display order and the display timing of the left and right frames 41 and 42 shown in section (A). The display device 2 outputs the synchronizing signal 5 at the substantially same time as a start of displaying the left eye frame 41. The display device 2 displays the right frame 42 on the display 210 after completion of displaying the left eye frame 41. The display device 2 further displays the left eye frame 41 on the display 210 after completion of displaying the right eye frame 42. The display device 2 outputs the synchronizing signal 5 at the substantially same time as the start of displaying the subsequent left eye frame 41. It should be noted that the present invention is not limited to the synchronizing signal transmitted from the display device 2 at the substantially same time as the start of displaying the left eye frame 41 without transmission of the synchronizing signal 5 during the display period of the right eye frame 42. Alternatively the display device 2 may transmit the synchronizing signal 5 at the substantially same time as a start of displaying the right eye frame 42 while the display device 2 may not transmit it during the display period of the left eye frame 41. For a clear description, the synchronizing signal 5 initially transmitted and received in FIG. 5 is referred to as a preceding first synchronizing signal 51 while the synchronizing signal 5 transmitted and received after the preceding first synchronizing signal 51 is referred to as the subsequent first synchronizing signal 52. In the present embodiment, waveforms of the preceding first synchronizing signal 51 and the subsequent first synchronizing signal 52 may be identical.

The first synchronizing signals 51 and 52 output from the display device 2 are received by the receiver 340 of the eyeglass device 3. The detector 350 detects these synchronizing signals 5 received by the receiver 340.

The analyzer 351 calculates a reception interval (time interval) T of the first synchronizing signals 51 and 52 detected by the detector 350. Subsequently, the display times of the left eye frame 41 and the right eye frame 42 are calculated under a condition that the display time of the right eye frame 42 and the display time of the left eye frame 41 are equivalent. Thus the analyzer 351 determines a starting time of the right eye frame 42, "T/2" after the reception of the preceding first synchronizing signal 51. The storage 360 preliminarily stores an offset time T1 for a time of switching from the left eye frame 41 to the right eye frame 42. The offset time T1, for example, determined based on characteristics of the display 210 in the display device 2 may be constant. Alternatively, a synchronizing signal 5 or any other signal transmitted from the display device 2 may be used for transmitting information relating to the offset time T1 to the eyeglass device 3.

The second generator 352 generates the internal signal 6 based on the aforementioned analysis by the analyzer 351. The second generator 352 generates an internal signal 61 used for control to open the left eye filter 31 corresponding to the time at which the preceding first synchronizing signal 51 is received (namely, the starting time of the left eye frame 41). Subsequently, the second generator 352 generates an internal signal 62 used for control to close the left eye filter 31 prior to the ending time of the left eye frame 41 by a length of the offset time T1. Moreover, the second generator 351 subsequently generates an internal signal 63 used for control to open the right eye filter 32 corresponding to the starting time of the right eye frame 42. Subsequently, the second generator 352 further generates an internal signal 64 used for control to close the right eye filter 32 prior to the starting time of the right eye frame 42 by a length of the offset time T1.

As aforementioned, the analyzer 351 analyzes a logical meaning of the synchronizing signal 5 detected by the detector 350. The display cycles of the left and right frames 41 and 42 displayed on the display 210 are analyzed by the analyzer 351 from the reception interval of the synchronizing signals 5 in the description in the context of section (B) of FIG. 5, but the present invention is not limited thereto. Alternatively the analyzer 351 may carry out other analyses.

Figure 6:
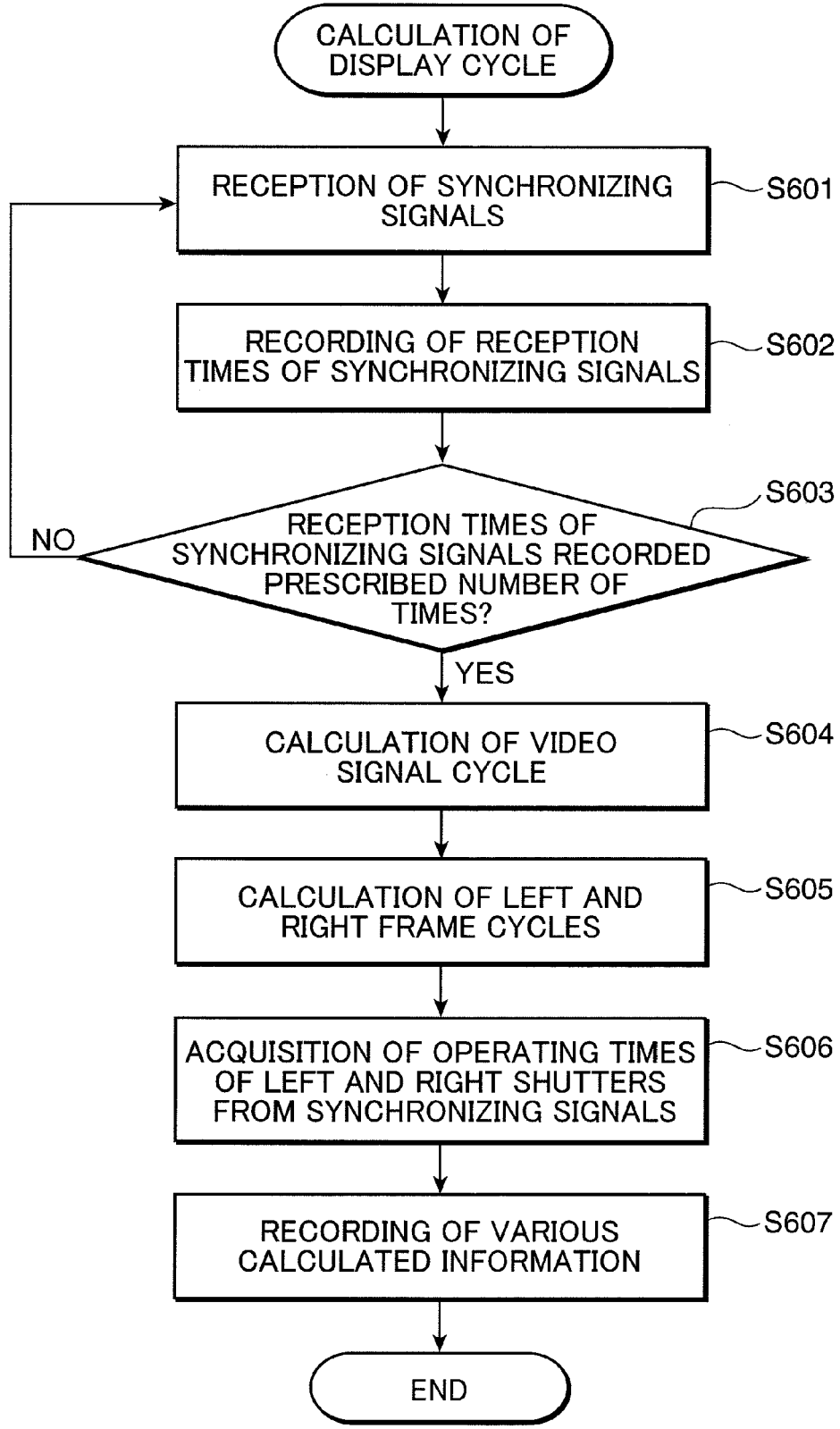
FIG. 6 is a flow chart of arithmetic processing steps executed by the eyeglass device shown in FIG. 1.

FIG. 6 is a flow chart showing steps for calculating and analyzing information required to generate the internal signal 6 based on the received synchronizing signal 5. The steps for calculating and analyzing the information required to generate the internal signal 6 are described with reference to FIGS. 2 to 5 together with FIG. 6.

The receiver 340 receives the synchronizing signal 5 (Step S601).

As soon as the receiver 340 receives the synchronizing signal 5, the receiver 340 also records a reception time of the synchronizing signal 5 in the storage 360 (Step S602). For example, the reception time of the synchronizing signal 5 may be temporarily stored in the memory 36 by acquiring time information with the CPU 35 of the eyeglass device 3 using the clock 37.

The analyzer 351 determines whether or not the synchronizing signal 5 and its reception time in Step S601 and Step S602 is recorded a prescribed number of times (Step S603). It should be noted that the present invention is not limited to two recordings of them used in the analysis by the analyzer 351 described in the context of FIG. 5. Alternatively the analyzer 351 may calculate and analyze information required for generating the internal signal 6 by using two or more recordings on the reception of the synchronizing signal 5 and the corresponding reception time. A threshold value for the number of the recordings may also be preliminarily recorded in the second storage 360 of the eyeglass device 3, for example.

In the case the number of the recordings is less than the prescribed number of the recordings, operation may return to Step S601 and the synchronizing signals 5 are received again.

Once the prescribed number of the reception times are recorded, the reception interval of the synchronizing signals 5 (time T shown in FIG. 5) is calculated (Step S604). For example, the reception interval of the synchronizing signals 5 is calculated through a difference arithmetic operation on the reception times of the synchronizing signals 5. The calculated reception interval is defined as the display cycle T of the left and right eye frames 41 and 42. Information on at least two reception times is required to calculate the display cycle T, but information on additional reception times may also be used.

For example, the analyzer 351 may calculate an average value of the difference between the reception times for the display cycle T by using information on three or more reception times, which may enhance accuracy of the display time T.

The analyzer 351 further calculates the display time (cycle) of the left eye frame 41 and the display time (cycle) of the right eye frame 42 by multiplying ½ by the display cycle T calculated in Step S604 (the display times of these frames 41 and 42 are shown as T/2 in FIG. 5) (Step S605).

As described in the context of FIG. 5, the opening and closing timing for the left and right eye filters 31 and 32 of the optical filter portion 330 in the eyeglass device 3 is calculated based on the cycles of the left and right frame 41 and 42 calculated in Step S605 (Step S606).

The analyzer 351 records information relating to the display cycle T, the display times of the frames 41 and 42, and the opening and closing timing of the optical filters 31 and 32 in the storage 360 according to the calculation in each step (Step S607).

The eyeglass device 3 may suitably calculate the opening and closing timing for the left and right optical filters 31 and 32 of the optical filter portion 330 simply by receiving the synchronizing signal 5 in synchronization with the left eye frame 41 from the display device 2 through the series of steps shown in FIG. 6. As aforementioned, the analyzer 351 analyses information of the synchronizing signal 5 in synchronization with one of the frames (left eye frame 41 and right eye frame 42) used as a three-dimensional image for the synchronizing information on another frame to which no synchronizing signal 5 corresponds. Thus, in the present embodiment, based on one of the left eye frame 41 and the right eye frame 42, the second generator 352 may generate the internal signals 6 in synchronization with another frame as well as the corresponding frame.

Figure 7:
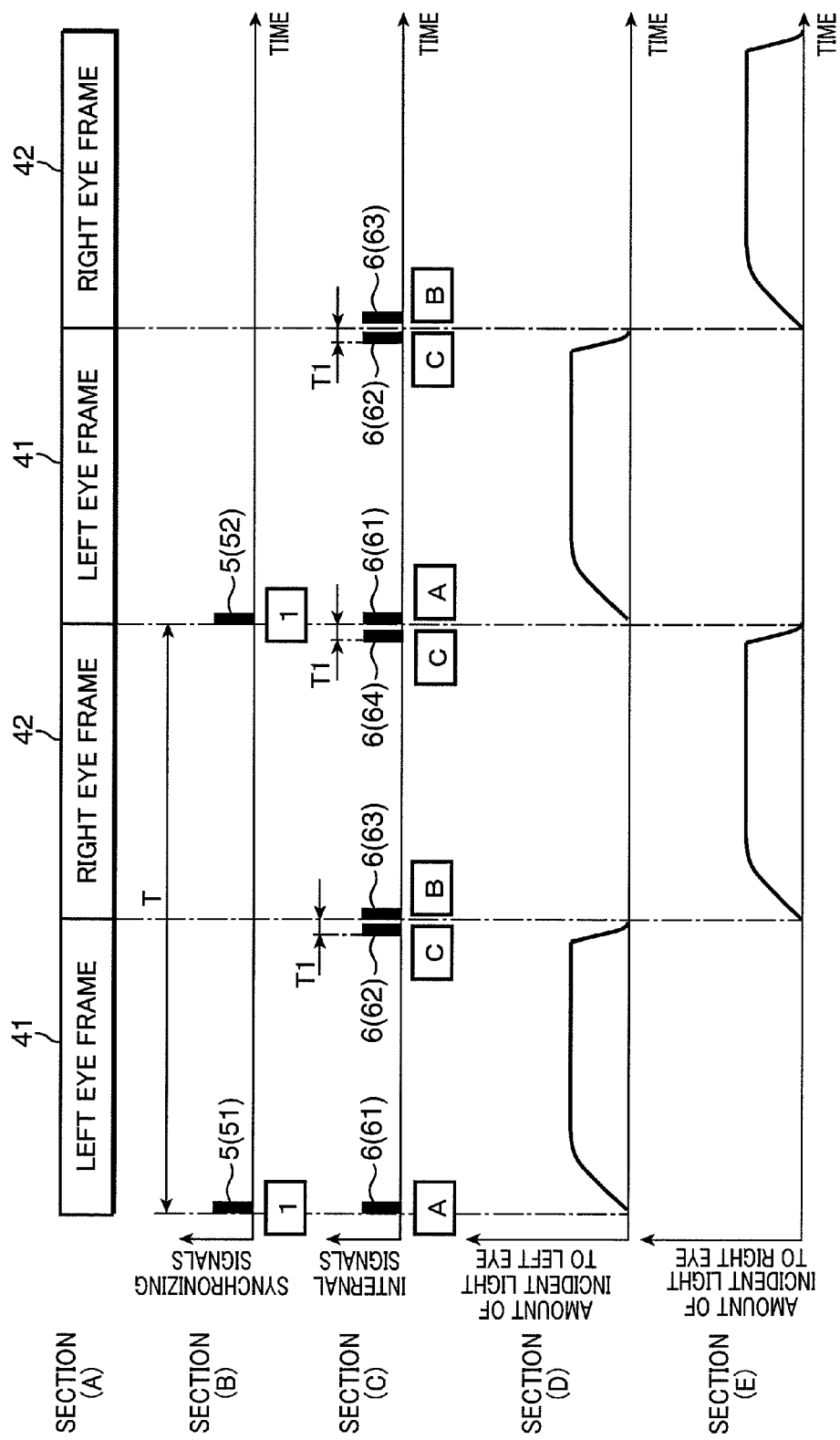
FIG. 7 shows control of an optical filter portion based on the internal signal shown in FIG. 5.

FIG. 7 shows control of the optical filter portion 330 based on the internal signal 6 described in the context of FIGS. 5 and 6. The control of the optical filter portion 330 based on the internal signal 6 is described with reference to FIGS. 3 and 4 together with FIG. 7. Sections (A) to (C) of FIG. 7 correspond to sections (A) to (C) of FIG. 5, respectively. Section (D) of FIG. 7 shows operation of the left eye filter 31 while section (E) of FIG. 7 shows operation of the right eye filter 32. The vertical axes of sections (D) and (E) of FIG. 7 represent an amount of an incident light to the left eye or right eye. An increase in the amount of the incident light means that the left eye filter 31 or the right eye filter 32 is open while a decrease in the amount of the incident light means that the left eye filter 31 or the right eye filter 32 is closed.

The second generator 352 generates the internal signal 6 within the eyeglass device 3 based on the display cycle T, the display times of the frames 41 and 42, and the opening and closing timing of the optical filters 31 and 32 stored in the storage 360. Section (C) of FIG. 7 shows the internal signal 6 generated by the second generator 352. As described in the context of FIG. 5, the internal signal 61 used for control to open the left eye filter 31 is generated corresponding to the starting time of the left eye frame 41. The internal signal 62 used for control to close the left eye filter 31 is generated prior to the ending time of the left eye frame 41 by the offset time T1. The internal signal 63 used for control to open the right eye filter 32 is generated corresponding to the starting time of the right eye frame 42. The internal signal 64 used for control to close the right eye filter 32 is generated prior to the starting time of the right eye frame 42 by the offset time T1.

The controller 353 controls the left eye filter 31 and the right eye filter 32 of the optical filter portion 330 based on the internal signal 6 generated by the second generator 352.

In FIG. 7, the left eye filter 31 is controlled on the basis of the internal signal 61 indicated with reference symbol A so that the amount of the light passing through the left eye filter 31 increases. Subsequently, the left eye filter 31 is controlled again based on the internal signal 62 indicated with reference symbol C so that the amount of the light passing through the left eye filter 31 decreases. The right eye filter 32 is then controlled on the basis of the internal signal 63 indicated with reference symbol B so that the amount of the light passing through the right eye filter 32 increases. Subsequently, the right eye filter 32 is again controlled on the basis of the internal signal 64 indicated with reference symbol C so that the amount of the light passing through the right eye filter 32 decreases.

As aforementioned, the eyeglass device 3 may control the left and right eye filters 31 and 32 based on a single synchronizing signal 5 transmitted from the display device 2 to increase or decrease the amount of the light passing them in synchronization with the video image of the display 210.

The display device 2 and the eyeglass device 3 according to the present embodiment may establish synchronization between the video image and the optical filter portion 330 by using the synchronizing signal 5 with a single type of waveform and using a relatively less frequent communication of the synchronizing signal 5. The single type of the waveform of the synchronization signal 5 may relatively simplify the signal processing such as the detection and the analysis for the synchronizing signal 5. In addition, low-frequency communication of the synchronizing signal 5 may result in less potential interference between the video system 1 and other equipment.

Calculation of the display cycle T in Step S604 described in the context of FIG. 6 may be omitted if the display cycle T is fixedly determined in advance. In this case, opening and closing timing of the left eye filter 31 and the right eye filter 32 may be calculated by using the predetermined display cycle T.

It should be noted that the present invention is not limited to multiple times of the reception of the synchronizing signal 5 to enhance accuracy of the calculation for the display cycle T in the context of FIG. 6. Alternatively the most reliable frequency of the video signal may be selected from a frequency group containing a plurality of predetermined frequencies (such as 96 Hz, 100 Hz, 120 Hz and 144 Hz) by comparing the difference value between the reception times of two received synchronizing signals with the frequencies in the frequency group.

<3. Electrical Power Control Based on Synchronizing Signal>

Figure 8:
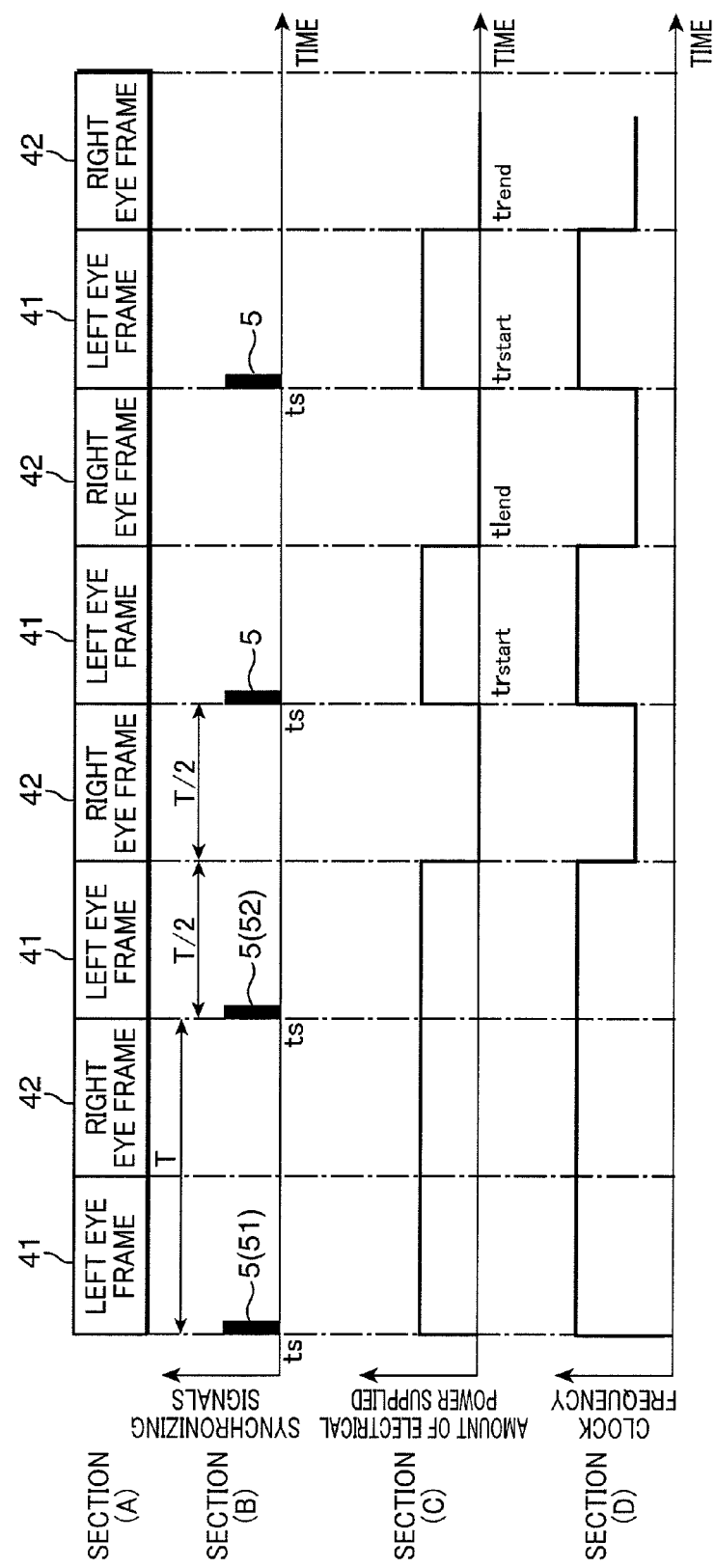
FIG. 8 shows power supply control based on a result from the arithmetic processing steps shown in FIG. 6.

FIG. 8 shows electrical power control using the synchronizing signal 5 from the display device 2 as described in the context of FIGS. 1 to 7. The electrical power control with the synchronizing signal 5 is explained with reference to FIGS. 2 to 6 together with FIG. 8.

Section (A) of FIG. 8 shows that the display 210 of the display device 2 alternately displays the left eye frame 41 and the right eye frame 42 sequentially. Section (B) shows that the transmitter 230 of the display device 2 transmits the synchronizing signal 5 in synchronization with the left eye frame 41 displayed by the display 210. Section (C) shows a change in an amount of power supplied to the receiver 340 of the eyeglass device 3 based on the synchronizing signal 5 from the display device 2. Section (D) shows a change in the clock frequency of the CPU 35 of the eyeglass device 3.

In the present invention, the preceding left eye frame 41 shown in section (A) (left eye frame 41 shown farthest to the left in FIG. 8) is the frame displayed on the display 210 immediately after activation of the eyeglass device 3. Alternatively, it may be considered that in FIG. 8 the first synchronizing signal 51 corresponding to the preceding eye frame 41 is successfully received by the eyeglass device 3 after unsuccessful reception of the synchronization signal 5 prior to the preceding left eye frame.

As aforementioned, immediately after the activation of the eyeglass device 3 or during continuous unsuccessful reception of the synchronization signal 5, the power supply portion 300 of the eyeglass device 3 continuously supply electrical power to the receiver 340 until the preceding first synchronizing signal 51 and the subsequent first synchronizing signal 52 are received. As described in the context of FIGS. 5 and 6, the eyeglass device 3 may calculate the display cycle T when the first synchronizing signals 51 and 52 are received. The display times of the left eye frame 41 (display starting time $tl_{start}$ and display ending time $tl_{end}$) and the display times of the right eye frame 42 (display starting time $tr_{start}$ and display ending time $tr_{end}$) are represented by the following equations using the display cycle T, where "ts" represents the reception time of the synchronizing signal 5. The term "nT" in the following equations represents a phase delay with respect to a display cycle including of the left eye frame 41 and the right eye frame 42 used in the arithmetic processing steps shown in FIG. 6. The term "n" representing a natural number may be suitably determined corresponding to the frame rate of the display device 2 and the arithmetic processing speed of the eyeglass device 3.

$$tl_{start} = t_s + nT \quad \text{[Eqn. 1]}$$

$$tl_{end} = t_s + \frac{T}{2} + nT \quad \text{[Eqn. 2]}$$

$$tr_{start} = t_s + \frac{T}{2} + nT \quad \text{[Eqn. 3]}$$

$$tr_{end} = t_s + T + nT \quad \text{[Eqn. 4]}$$

The analyzer 351 transmits a signal to the power supply portion 300 so that electrical power is not supplied to the receiver 340 from time $tr_{start}$ to time $tr_{end}$. As a result, as shown in section (C) of FIG. 8, the power supply portion 300 interrupts the power supply to the receiver 340 from time $tr_{start}$ to time $tr_{end}$ (during the display time of the right eye frame 42). Thus, the eyeglass device 3 conserves electrical power because of less power consumption in the receiver 340. As aforementioned, the interruption of electrical power from the power supply portion 300 may not affect control of the eyeglass device 3 because of no transmission of the synchronizing signal 5 from time $tr_{start}$ to time $tr_{end}$ (during the display time of the right eye frame 42). As shown in section (C) of FIG. 8, the receiver 340 may preferably receive the synchronizing signals 5 because the power supply portion 300 supplies electrical power to the receiver 340 during the display period of the left eye frame 41 when the synchronizing signals 5 are transmitted.

Moreover, the clock frequency of the CPU 35 in charge of the operation of the analyzer 351 and the detector 350 may be decreased because it is not necessary to detect or analyze the synchronizing signal 5 during the interruption of electrical power from the power supply portion 300, which results in less electrical power consumption of the CPU 35. As shown in section (D) of FIG. 8, the clock frequency of the CPU 35 during the display period of the right eye frame 42 is lower than the clock frequency during the display period of the left eye frame 41.

In the first embodiment, the synchronizing signal 5 in synchronization with one of the left eye frame 41 and the right eye frame 42 displayed on the display 210 may be transmitted to the eyeglass device 3 from the display device 2. The eyeglass device 3 may control the left eye filter 31 and the right eye filter 32 by generating the internal signal 6 based on the received synchronizing signal 5. In this manner, synchronization may be established between the display device 2 and the eyeglass device 3 through the simplified communication of the synchronizing signal 5.

It should be noted that the present invention is not limited to the synchronizing signal 5 from the display device 2 to the eyeglass device 3 used for opening the left eye filter 31 (increase the amount of the light passing it) according to the first embodiment. Alternatively the synchronizing signal 5 may be used for communication between the display device 2 and the eyeglass device 3 in operations including (1) closing the left eye filter 31 (decreasing the amount of the transmitted light), (2) opening the right eye filter 32 and (3) closing the right eye filter 32.

In addition, the present invention is not limited to the timing for supplying electrical power to the receiver 340 from the power supply portion 300 as shown in section (C) of FIG. 8 although the electrical power supply begins at the substantially same time as switching between the left and right eye frames as shown in section (A) of FIG. 8 according to the first embodiment. Alternatively, the power supply portion 300 may adjust a start timing of the electrical power supply so that the start timing of the electrical power supply to the receiver 340 and the timing of opening and closing of the optical filter portion 330 are not simultaneous (by at least providing a prescribed time interval) because the substantially simultaneous electrical power supply from the power supply portion 300 to the optical filter portion 330 and the receiver 340, which may be happened if the left eye frame starts to be displayed at the substantially same time as the start of the electrical power supply to the receiver 340, the power supply portion 300 has to supply a large amount of electrical power to be consumed, which may result in a drop in the supplied voltage if a battery and the like is used as the power supply portion 300.

Second Embodiment

The optical filter portion 330 of the eyeglass device 3 according to the present embodiment is subjected to more sophisticated control. For example, a control for opening the left eye filter 31 and/or the right eye filter 32 after sufficient emission from the emitter in the display 210 and a control for decreasing the amount of the light passing through the left eye filter 31 and/or the right eye filter 32 before the emission decreases below a predetermined value may be advantageous if afterglow characteristics (characteristics causing light from a video image of a preceding frame to remain during a display period of the subsequent video image frame) of the display 210 (such as a PDP) are large. The first embodiment may not be directed to controls in accordance with the characteristics of the display 210 (such as the afterglow characteristics described above).

Figure 9:
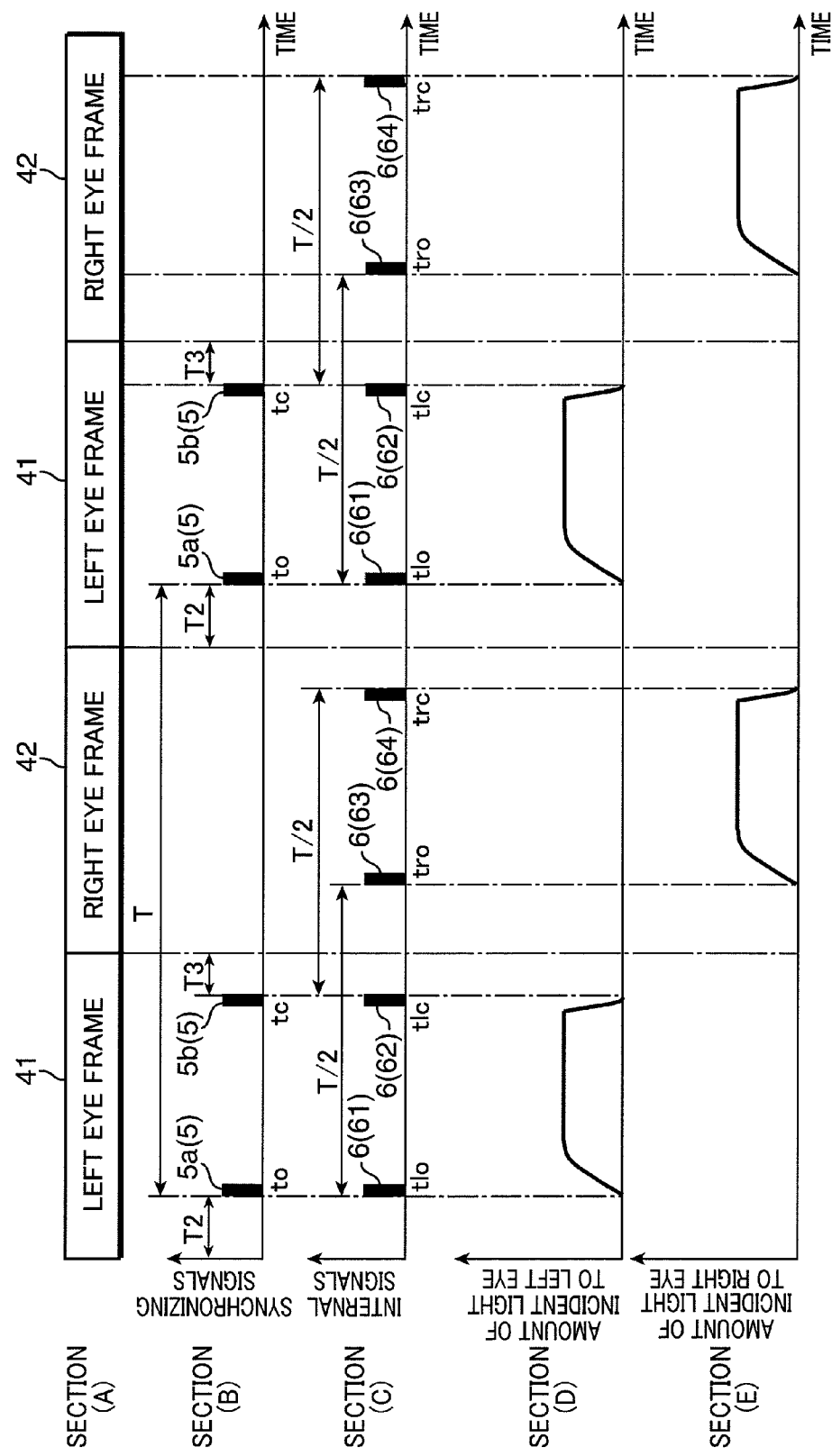
FIG. 9 shows transmission of the synchronizing signal from the display device shown in FIG. 1 and generation of the internal signal based on the synchronizing signal.

FIG. 9 shows a relationship among the frame displayed on the display 210 of the display device 2, the synchronizing signals 5a and 5b transmitted from the transmitter 230 of the display device 2, the internal signal 6 generated by the second generator 352 of the eyeglass device 3, and operation of the optical filter portion 330 of the eyeglass device 3. Section (A) of FIG. 9 shows that the display 210 of the display device 2 alternately displays the left eye frame 41 and the right eye frame 42 sequentially. Section (B) indicates that the transmitter 230 of the display device 2 transmits the synchronizing signals 5a and 5b in synchronization with the left eye frame 41 displayed by the display 210. Section (C) shows the internal signal 6 generated on the basis of the synchronizing signals 5a and 5b. Section (D) shows operation of the left eye filter 31 while section (E) shows operation of the right eye filter 32. The control for the optical filter portion 330 is explained with reference to FIGS. 2 to 4 together with FIG. 9.

As shown in section (B) of FIG. 9, the display device 2 transmits two synchronizing signals 5a and 5b during the display period of each left eye frame 41. Between the synchronizing signals 5a and 5b shown in FIG. 9, reference symbol "5a" indicates the synchronizing signal transmitted ahead during the display period of the left eye frame 41, and reference symbol "5b" indicates the synchronizing signal subsequently transmitted. The preceding synchronizing signal 5a is an opening signal used to generate an internal signal 6 used for control to open the left eye filter 31 and/or the right eye filter 32 while the subsequent synchronizing signal 5b is a closing signal used to generate an internal signal 6 used for control to close the left eye filter 31 and/or the right eye filter 32. A waveform of the opening signal 5a is preferably different from a waveform of the closing signal 5b. The analyzer 351 of the eyeglass device 3 identifies the type of the synchronizing signal 5 based on the difference in the waveforms between the opening signal 5a and the closing signal 5b.

The opening signal 5a is transmitted a time T2 after a display start of the left eye frame 41. The closing signal 5b is transmitted a time T3 before a display end of the left eye frame 41. The analyzer 351 of the eyeglass device 3 executes the analysis steps described in the context of FIG. 6 and calculates the display cycle T using the opening signal 5a as a reference synchronizing signal 5. It should be noted that the present invention is not limited to the opening signal 5a used as a reference synchronizing signal 5 for execution of the analysis step in the present embodiment. Alternatively the analysis step may be executed by using the closing signal 5b as the reference synchronizing signal 5. For example, one of the opening signal 5a and the closing signal 5b may be preliminarily determined to be the reference synchronizing signal by a program installed in the memory 36 of the eyeglass device 3, or the analyzer 351 may execute the analysis step by determining more frequently received one of the opening signal 5a and the closing signal 5b as the reference synchronizing signal 5.

The analyzer 351 stores time data indicated by the following equations (time at which the left eye filter 31 is to be opened, time at which the left eye filter 31 is to be closed, time at which the right eye filter 32 is to be opened, and time at which the right eye filter 32 is to be closed), the reception time of the closing signal 5b and the calculated display cycle T in the storage 360 based on the reception time of the opening signal 5a. In the following equations, the reception time of the opening signal 5a is represented with "$t_o$" while the reception time of the closing signal 5b is represented with "$t_c$". The time at which the left eye filter 31 is to be opened is represented with "$t_{lo}$" while the time at which the left eye filter 31 is to be closed is represented with "$t_{lc}$". The time at which the right eye filter 32 is to be opened is represented with "$t_{ro}$" while the time at which the right eye filter 32 is to be closed is represented with "$t_{rc}$". The term "nT" in the following equations represents a phase delay with respect to the display cycle T including the left eye frame 41 and the right eye frame 42 used in the arithmetic processing steps shown in FIG. 6. The term "n" representing a natural number is suitably determined corresponding to the frame rate of the display device 2 and the arithmetic processing speed of the eyeglass device 3.

$$t_{lo} = t_o + nT \quad \text{[Eqn. 5]}$$

$$t_{lc} = t_c + nT \quad \text{[Eqn. 6]}$$

$$t_{ro} = t_o + \frac{T}{2} + nT \quad \text{[Eqn. 7]}$$

$$t_{rc} = t_c + \frac{T}{2} + nT \quad \text{[Eqn. 8]}$$

As shown in section (C) of FIG. 9, the second generator 352 generates the internal signal 6 based on the above-mentioned data recorded in the storage 360. The internal signal 6 generated at time "$t_{lo}$" is an internal signal 61 used for control to open the left eye filter 31 while the internal signal 6 generated at time "$t_{lc}$" is an internal signal 62 used for control to close the left eye filter 31. The internal signal 6 generated at time "$t_{ro}$" is an internal signal 63 used for control to open the right eye filter 32 while the internal signal 6 generated at time "$t_{rc}$" is an internal signal 64 used for control to close the right eye filter 32.

The controller 353 controls the left eye filter 31 based on the internal signal 61 to increase the amount of the light passing through the left eye filter 31 at time "$t_{lo}$". The controller 353 controls the left eye filter 31 based on the internal signal 62 to decrease the amount of the light passing through the left eye filter 31 at time "$t_{lc}$". The controller 353 controls the right eye filter 32 based on the internal signal 63 to increase the amount of the light passing through the right eye filter 32 at time "$t_{ro}$". The controller 353 controls the right eye filter 32 based on the internal signal 64 to decrease the amount of the light passing through the right eye filter 32 at time "$t_{rc}$".

FIGS. 10A to 10D exemplarily shows waveforms of the synchronizing signal 5 transmitted from the display device 2. The waveform of the opening signal 5a and the waveform of the closing signal 5b shown in FIG. 9 are mutually different as aforementioned. The waveform of the starting signal 5a and the waveform of the closing signal 5b may be selected from the waveforms shown in FIGS. 10A to 10D, for example. The waveform of the synchronizing signal 5 is explained with reference to FIG. 9 together with FIGS. 10A to 10D.

FIG. 10A shows various types of the synchronizing signals 5 with different pulse numbers. The analyzer 351 of the eyeglass device 3 may identify the type of the synchronizing signal 5 according to the number of the pulses in the received synchronizing signal 5. The analyzer 351 identifies the type of the synchronizing signal 5 by counting the pulses continuously received. For example, the analyzer 351 described in the context of FIG. 9 may identify a received synchronizing signal 5 as the opening signal 5a when the number of the pulses in the synchronizing signal 5 is 1 while the analyzer 351 may identify a received synchronizing signal 5 as the closing signal 5b when the number of the pulses in the synchronizing signal 5 is 2. Various synchronizing signals 5 as many as the number of the pulses may be available according to the pattern of the synchronizing signal 5 shown in FIG. 10A.

FIG. 10B shows various types of the synchronizing signals 5 with different pulse time widths (pulse widths). As described in the context of FIGS. 1 to 3, when the infrared light is used for communication of the synchronizing signal 5, the pulse time width is adjusted by controlling a duration when the infrared emitter 23 of the display device 2 illuminates (by using the transmission controller 270, for example). The analyzer 351 measures the time period during which the received synchronizing signal 5 is continuously active to identify the type of the synchronizing signal 5. For example, the analyzer 351 described in the context of FIG. 9 may identify the narrowest pulse as the closing signal 5a while may identify a wider pulse (for example, twice as long) than the pulse width of the opening signal 5a as the closing signal 5b.

FIG. 10C shows various types of the synchronizing signals 5 with a different time interval between two consecutive pulses. The analyzer 351 measures the time interval between two pulses in the received synchronizing signal 5 to identify the type of the synchronizing signal 5. For example, the analyzer 351 described in the context of FIG. 9 may identify a synchronizing signal 5 with the shortest time interval between a pair of the pulses in the synchronizing signal 5 as the opening signal 5a while the analyzer 351 may identify a synchronizing signal 5 with a longer time interval between the pulses (for example, twice as long) than the opening signal 5a as the closing signal 5b.

FIG. 10D shows various types of the synchronizing signals 5 with different pulse train patterns. Each pulse shown in FIG. 10D may correspond to 1 bit of data. The synchronizing signal 5 shown in FIG. 10D may contain a maximum of five pulses. In the synchronizing signal 5 farthest to the left indicated with reference symbol "1", only the first pulse among the five pulses is active while the other pulses are inactive. In the synchronizing signal 5 indicated with reference symbol "2", only the first two pulses are active while the other pulses are inactive. In the synchronizing signal 5 indicated with reference symbol "3", the first and third pulses are active while the other pulses are inactive. In the synchronizing signal indicated with reference symbol "4" (the synchronizing signal 5 farthest to the right), the first three pulses are active while the other pulses are inactive. The analyzer 351 may identify the type of the synchronizing signal 5 based on the pulse pattern of the synchronizing signal 5. For example, the analyzer 351 described in the context of FIG. 9 may identify a synchronizing signal 5 with the pattern indicated with reference symbol "1" as the opening signal 5a while the analyzer 351 may identify a synchronizing signal 5 with the pattern indicated with reference symbol "2" as the closing signal 5b.

It should be noted that the present invention is not limited to merely exemplary waveforms of the synchronizing signals 5 shown in FIGS. 10A to 10D. Combining waveforms shown in FIG. 10 may be applied to the communication of the various types of the synchronizing signals 5. For example, the type of the synchronizing signal 5 may be identified by combining the pulse numbers shown in FIG. 10A with the pulse time widths shown in FIG. 10B. Alternatively, communication between the display device 2 and the eyeglass device 3 may also be carried out using any other identifiable types of the synchronizing signals 5.

Figure 10:
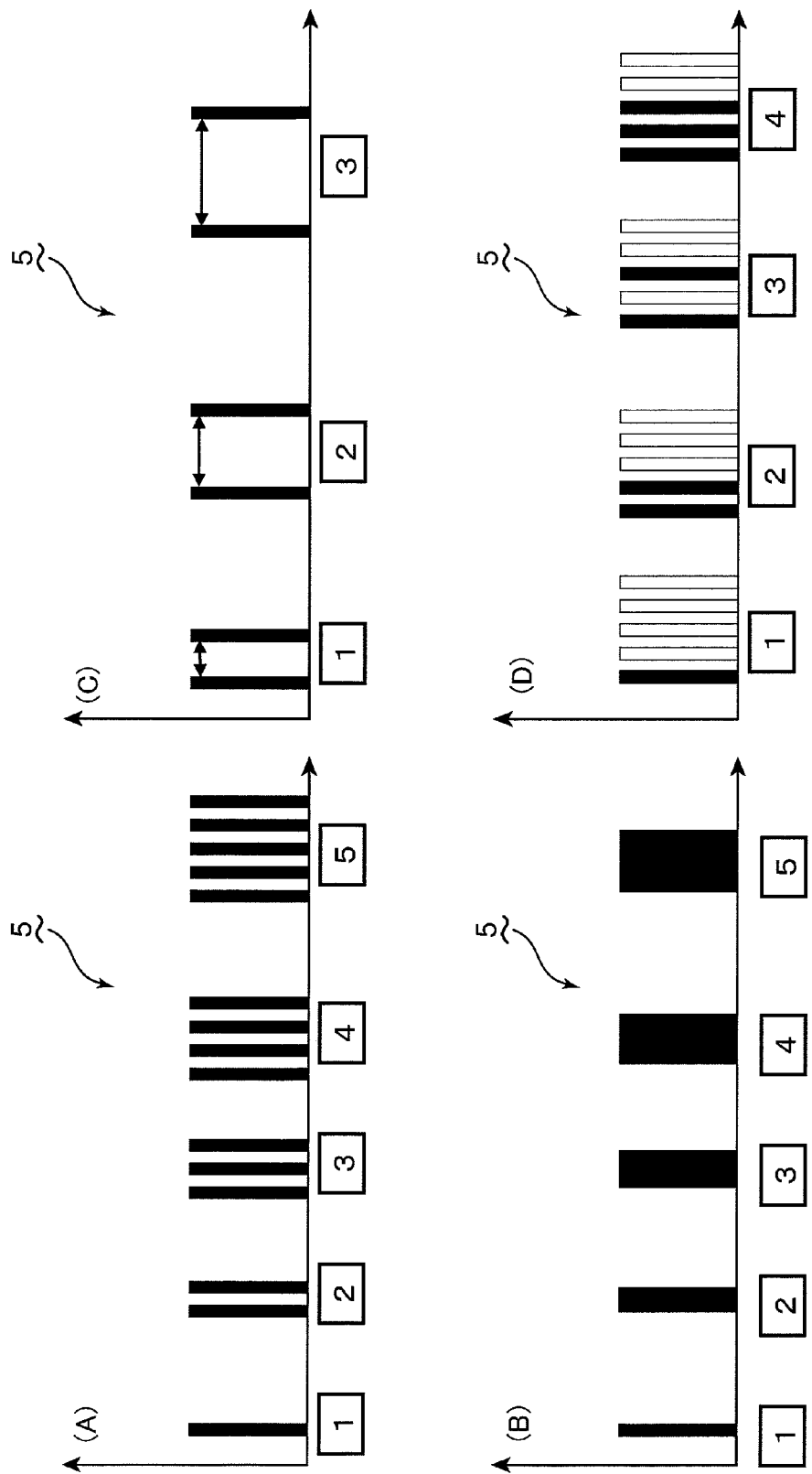
FIG. 10 shows a waveform of the synchronizing signal shown in FIG. 9.
Figure 11:
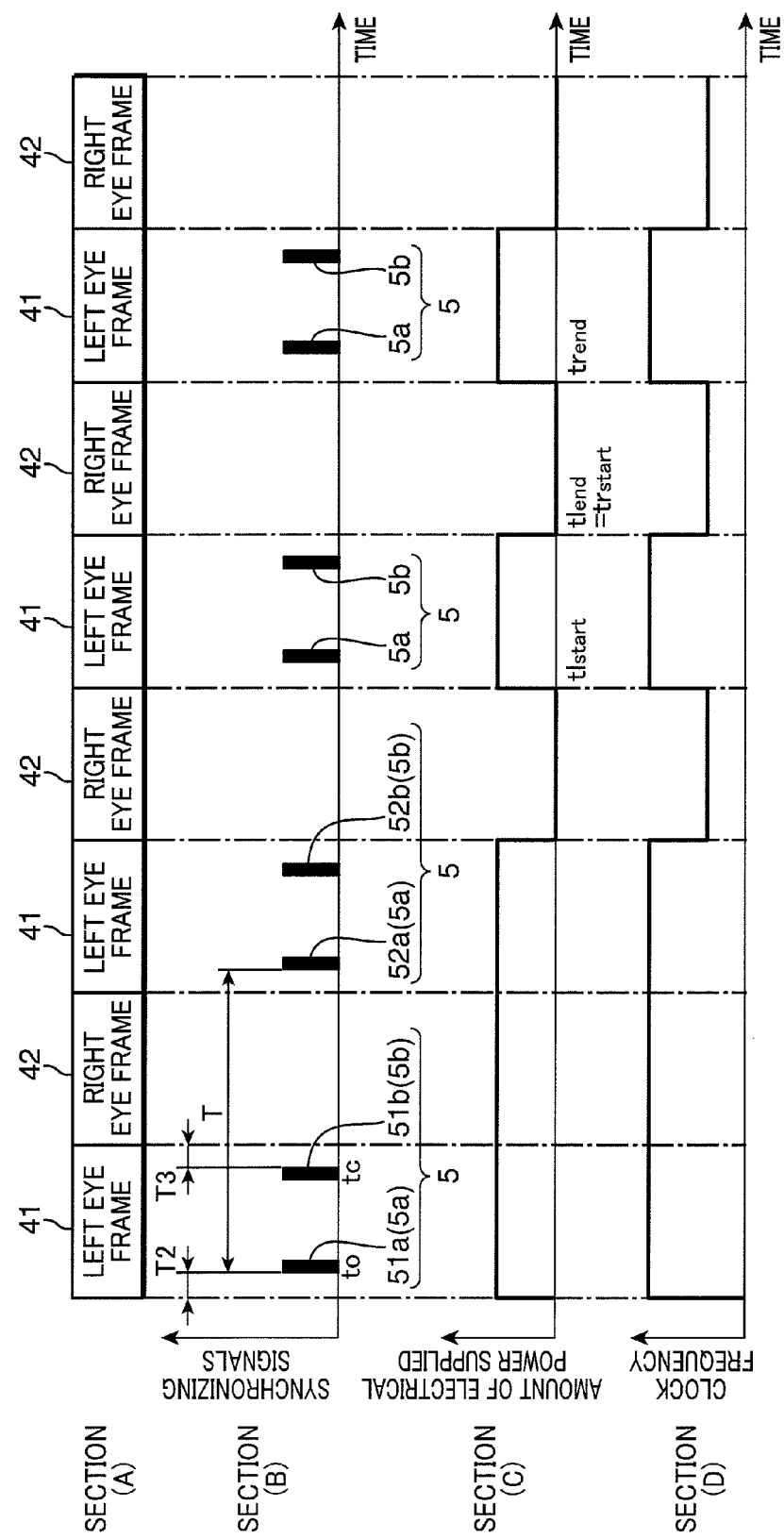
FIG. 11 shows power supply control based on the synchronizing signal shown in FIG. 9.

FIG. 11 shows control of electrical power with the synchronizing signal 5 from the display device 2 as described in the context of FIGS. 9 and 10A to 10D. The control of the electrical power with the synchronizing signal 5 is explained with reference to FIGS. 2 to 6 and FIG. 9 together with FIG. 11.

Section (A) of FIG. 11 shows that the display 210 of the display device 2 alternately displays the left eye frame 41 and the right eye frame 42 sequentially. Section (B) shows that the transmitter 230 of the display device 2 transmits the synchronizing signal 5 in synchronization with the left eye frame 41 displayed by the display 210. Section (C) shows a change in an amount of the electrical power supplied to the receiver 340 of the eyeglass device 3 based on the synchronizing signal 5 from the display device 2. Section (D) shows a change in a clock frequency of the CPU 35 in the eyeglass device 3.

In the present invention, the preceding left eye frame 41 shown in section (A) (left eye frame 41 shown farthest to the left in FIG. 11) is an frame displayed on the display 210 immediately after activation of the eyeglass device 3. Alternatively, it may be considered that the first synchronizing signal 51a corresponding to the preceding left eye frame 41 is successfully received by the eyeglass device 3 after a continuous unsuccessful reception of the synchronizing signal 5 prior to the preceding left eye frame 41.

In section (B), reference symbol "51a" or reference symbol "51b" indicates the preceding first synchronizing signal which corresponds to the preceding left eye frame 41 while reference symbol "52a" or reference symbol "52b" indicates the subsequent first synchronizing signal which corresponds to the subsequent left eye frame 42. In addition, the first synchronizing signals 51a and 52a are used as the above-mentioned opening signal 5a while the first synchronizing signals 51b and 52b are used as the above-mentioned closing signal 5b. As aforementioned, immediately after the activation of the eyeglass device 3 or during the continuous unsuccessful reception of the synchronizing signal 5, the power supply portion 300 of the eyeglass device 3 continuously supplies electrical power to the receiver 340 until the preceding first synchronizing signals 51a and 51b and the subsequent first synchronizing signals 52a and 52b are received. As described in the context of FIG. 9, the eyeglass device 3 may calculate the display cycle T based on the reception interval of the opening signal 5a of two synchronizing signals 5 received during each display of the left eye frame 41.

As described in the context of FIG. 9, the opening signal 5a is received a delay time T2 after the display starting time $tl_{start}$ of the left eye frame 41. The closing signal 5b is received a time T3 before the display ending time $tl_{end}$ of the left eye frame 41. Data relating to the time T2 and the time T3 may be preliminarily recorded in the storage 360 of the eyeglass device 3. Alternatively it may be transmitted from the display device 2 to the eyeglass device 3 with the opening signal 5a and/or the closing signal 5b.

The display times of the left eye frame 41 (display starting time $tl_{start}$ and display ending time $tl_{end}$) are represented with the following equations using the display cycle T, the offset times T2 and T3 of the opening signal 5a and the closing signal 5a with respect to the display starting time and the display ending time of the left eye frame 41, the reception time $t_o$ of the opening signal 5a and the reception time $t_c$ of the closing signal 5b. The term "nT" in the following equations represents a phase delay with respect to a display cycle (frame group) including the left eye frame 41 and the right eye frame 42 used in the arithmetic processing steps shown in FIG. 6. The term "n" representing a natural number is suitably determined corresponding to the frame rate of the display device 2 and the arithmetic processing speed of the eyeglass device 3.

$$tl_{start} = t_o - T2 + nT \quad [\text{Eqn. 9}]$$

$$tl_{end} = t_c + T3 + nT \quad [\text{Eqn. 10}]$$

$$tr_{start} = tl_{end} \quad [\text{Eqn. 11}]$$

$$tr_{end} = tl_{end} + \frac{T}{2} \quad [\text{Eqn. 12}]$$

The analyzer 351 transmits a signal to the power supply portion 300 so that electrical power is not supplied to the receiver 340 from time $tr_{start}$ to time $tr_{end}$. As a result, as shown in section (C) of FIG. 11, the power supply portion 300 interrupts the power supply to the receiver 340 from time $tr_{start}$ to time $tr_{end}$ (during the display time of the right eye frame 42). Thus, the eyeglass device 3 conserves electrical power because of less power consumption of the receiver 340. As aforementioned, the interruption of the electrical power from the power supply portion 300 may not affect control of the eyeglass device 3 because of no synchronizing signal 5 transmitted from time $tr_{start}$ to time $tr_{end}$ (during the display time of the right eye frame 42). As shown in section (C) of FIG. 11, the receiver 340 may preferably receive the synchronizing signals 5 because of the electrical power supply from the power supply portion 300 to the receiver 340 during the display period of the left eye frame 41 when the synchronizing signals 5 are transmitted.

Moreover, the clock frequency of the CPU 35 in charge of the operation of the analyzer 351 and the detector 350 may be decreased because it is not necessary to detect or analyze the synchronizing signal 5 during the interruption of the electrical power from the power supply portion 300, which results in less electrical power consumption by the CPU 35. As shown in section (D) of FIG. 11, the clock frequency of the CPU 35 during the display period of the right eye frame 42 is lower than the clock frequency during the display period of the left eye frame 41.

Figure 12:
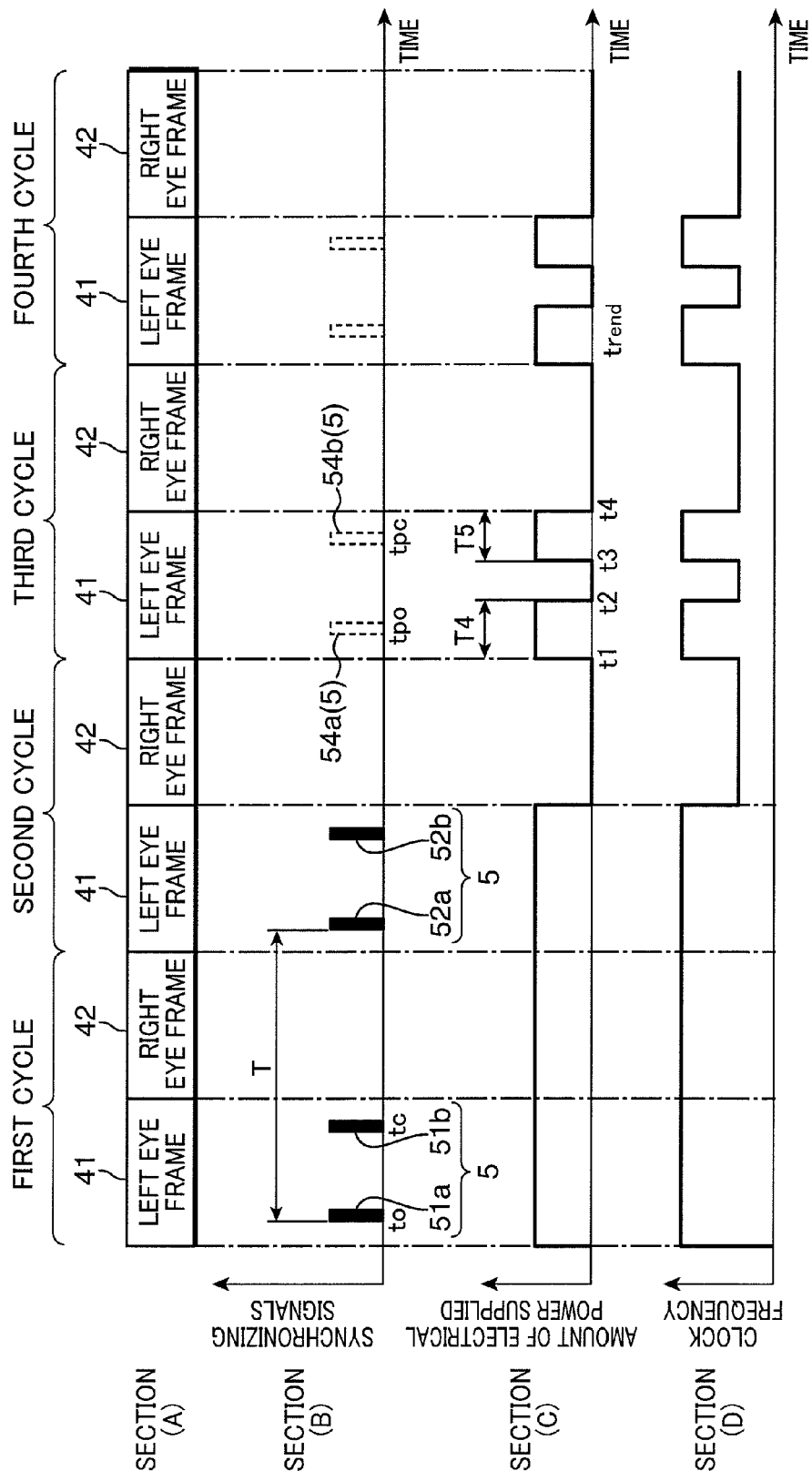
FIG. 12 shows power supply control based on the synchronizing signal shown in FIG. 9.

FIG. 12 shows further improved control for the electrical power with the synchronizing signal 5 from the display device 2 described in the context of FIGS. 9 and 10. The control for the electrical power with the synchronizing signal 5 is explained with reference to FIGS. 2 to 6 and FIG. 11 together with FIG. 12.

Section (A) of FIG. 12 shows that the display 210 of the display device 2 alternately displays the left eye frame 41 and the right eye frame 42 sequentially. Section (B) shows that the transmitter 230 of the display device 2 transmits the synchronizing signal 5 in synchronization with the left eye frame 41 displayed by the display 210. Section (C) shows a change in the amount of the electrical power supplied to the receiver 340 of the eyeglass device 3 based on the synchronizing signal 5 from the display device 2. Section (D) shows a change in the clock frequency of the CPU 35 in the eyeglass device 3.

As described in the context of FIG. 11, the display cycle T is calculated based on the opening signals 51a and 52a and/or the closing signals 51b and 52b received during the display period of the preceding two cycles (first cycle and second cycle) including the left eye frame 41 and the right eye frame 42. As a result, the reception times of the received first synchronizing signals 54a and 54b in the subsequent display cycle (third cycle) may be predicted. It should be noted that the first synchronizing signal 54a of the first synchronizing signals 54a and 54b is used as the above-mentioned opening signal while the first synchronizing signal 54b is used as the above-mentioned closing signal. Reception times "$t_{po}$" and "$t_{pc}$" predicted for the first synchronizing signals 54a and 54b to be received during the third cycle after the first cycle and the second cycle used in the arithmetic processing steps shown in FIG. 6 are represented by the following equations using the reception times "$t_{lo}$" and "$t_{rc}$" of the first synchronizing signals 51a and 51b received during the first cycle.

$$t_{po} = t_o + 2T \quad [\text{Eqn. 13}]$$

$$t_{pc} = t_c + 2T \quad [\text{Eqn. 14}]$$

Periods T4 and T5, for example, of which central values may be the predicted reception times "$t_{po}$" and "$t_{pc}$" for the first synchronizing signals 54a and 54b calculated based on the equations 13 and 14 shown above, are preliminarily recorded in the storage 360 of the eyeglass device 3. The analyzer 351 may determine the predicted periods for receiving the first synchronizing signals 54a and 54b to be from time "$t_1$" to time "$t_2$" (first predicted period) and from time "$t_3$" to time "$t_4$" (second predicted period) by using the predicted reception times "$t_{po}$" and "$t_{pc}$" along with the periods T4 and T5 preliminarily recorded in the storage 360. The analyzer 351 calculates times "$t_1$" to "$t_4$" using the equations shown below.

$$t_1 = t_{po} - \frac{T4}{2} \quad \text{[Eqn. 15]}$$

$$t_2 = t_{po} + \frac{T4}{2} \quad \text{[Eqn. 16]}$$

$$t_3 = t_{po} - \frac{T5}{2} \quad \text{[Eqn. 17]}$$

$$t_4 = t_{po} + \frac{T5}{2} \quad \text{[Eqn. 18]}$$

The analyzer 351 records the times "$t_1$" to "$t_4$" calculated using the above-mentioned equations in the storage 360. The power supply portion 300 controls the electrical power supply to the receiver 340 based on the times "$t_1$" to "$t_4$" recorded in the storage 360. As a result, the receiver 340 is supplied with the electrical power from time "$t_1$" to time "$t_2$" and from time "$t_3$" to time "$t_4$", but the receiver 340 is not supplied with the electrical power from time "$t_2$" to "$t_3$". Thus, the eyeglass device 3 conserves electrical power because of less power consumption by the receiver 340. As aforementioned, the interruption of the electrical power from the power supply portion 300 may not affect control of the eyeglass device 3 because of no synchronizing signal 5 transmitted from time "$t_2$" to time "$t_3$". As shown in section (C) of FIG. 12, the receiver 340 may preferably receive the synchronizing signal 5 because the power supply portion 300 supplies the electrical power to the receiver 340 when the synchronizing signal 5 is transmitted.

Moreover, the clock frequency of the CPU 35 in charge of the operation of the analyzer 351 and the detector 350 may be decreased because it is not necessary to detect or analyze the synchronizing signal 5 during the interruption of the electrical power from the power supply portion 300, which results in less electrical power consumption by the CPU 35. As shown in section (D) of FIG. 12, the clock frequency of the CPU 35 is decreased while the electrical power supply is interrupted.

The period during which the electrical power supply is interrupted may also be set on the basis of the display starting time "$tl_{start}$" and the display ending time "$tl_{end}$" of the left eye frame 41. The display starting time "$tl_{start}$" and the display ending time "$tl_{end}$" of the left eye frame 41 during the third cycle are calculated on the basis of the above-mentioned equations (9) and (10). The power supply starting time "$t_1$" and the power supply interruption time "$t_2$" corresponding to the opening signal 54a transmitted during the left eye frame 41 (third cycle) as well as the power supply starting time "$t_3$" and the power supply interruption time "$t_4$" corresponding to the closing signal 54b after the opening signal 54a are calculated according to the equations shown below.

$$t_1 = tl_{start} \quad \text{[Eqn. 19]}$$

$$t_2 = tl_{start} + T4 \quad \text{[Eqn. 20]}$$

$$t_3 = tl_{end} - T5 \quad \text{[Eqn. 21]}$$

$$t_4 = tl_{end} \quad \text{[Eqn. 22]}$$

As aforementioned, the optical filter portion 330 may be subjected to more sophisticated control according to the present embodiment. A conventional communication may require more various types of the synchronization signals with mutually different waveforms to be processed (synchronizing signal 5 for opening the left eye filter 31, synchronizing signal 5 for closing the left eye filter 31, synchronizing signal 5 for opening the right eye filter 32 and synchronizing signal 5 for closing the right eye filter 32) for the above-described control. Moreover, a conventional communication may also require greater signal processing capacity because of more frequent communication of the synchronizing signal 5 than the present embodiment. In the present embodiment, more sophisticated control of the optical filter portion 330 may be achieved using fewer types of the synchronizing signal and using less frequent communication of the synchronizing signal than the prior art. Thus, in addition to establishment of the synchronization between the display device 2 and the eyeglass device 3 by simpler communication than the prior art, the present embodiment may provide highly accurate control for the optical filter portion 330.

It should be noted that the synchronizing signal 5a transmitted ahead (first synchronizing signals 51a, 52a and 54a) is used as an opening signal corresponding to the internal signal 61 for opening the left eye filter 31 (increasing the amount of the transmitted light), and the synchronizing signal 5b subsequently transmitted (first synchronizing signals 51b, 52b and 54b) is used as a closing signal corresponding to the internal signal 62 for closing the left eye filter 31 (decreasing the amount of the transmitted light) in the present embodiment, but the present invention is not limited to this combination. For example, (1) the synchronizing signal 5a transmitted ahead may correspond to the internal signal 61 for opening the left eye filter 31 (increasing the amount of the transmitted light), while the synchronizing signal 5b subsequently transmitted may correspond to the internal signal 63 for opening the right eye filter 32. Alternatively, (2) the synchronizing signal 5a transmitted ahead may correspond to the internal signal 61 for opening the left eye filter 31 while the synchronizing signal 5b subsequently transmitted may correspond to the internal signal 64 for closing the right eye filter 32. Alternatively, (3) the synchronizing signal 5a transmitted ahead may correspond to the internal signal 63 for opening the right eye filter 32 while the synchronizing signal 5b subsequently transmitted may correspond to the internal signal 64 for closing the right eye filter 32.

The synchronization based on a correlation between the synchronizing signal 5 and the internal signal 6 as described above may be established between the display device 2 and the eyeglass device 3 with a half frequency of the communication compared with prior arts (in which the synchronizing signal 5 every opening and closing operation of the left eye filter 31 and the right eye filter 32 has to be communicated).

Third Embodiment

Further less frequent communication of the synchronizing signals 5 is provided with highly accurate control of the optical filter portion 330 similarly to the second embodiment.

Figure 13:
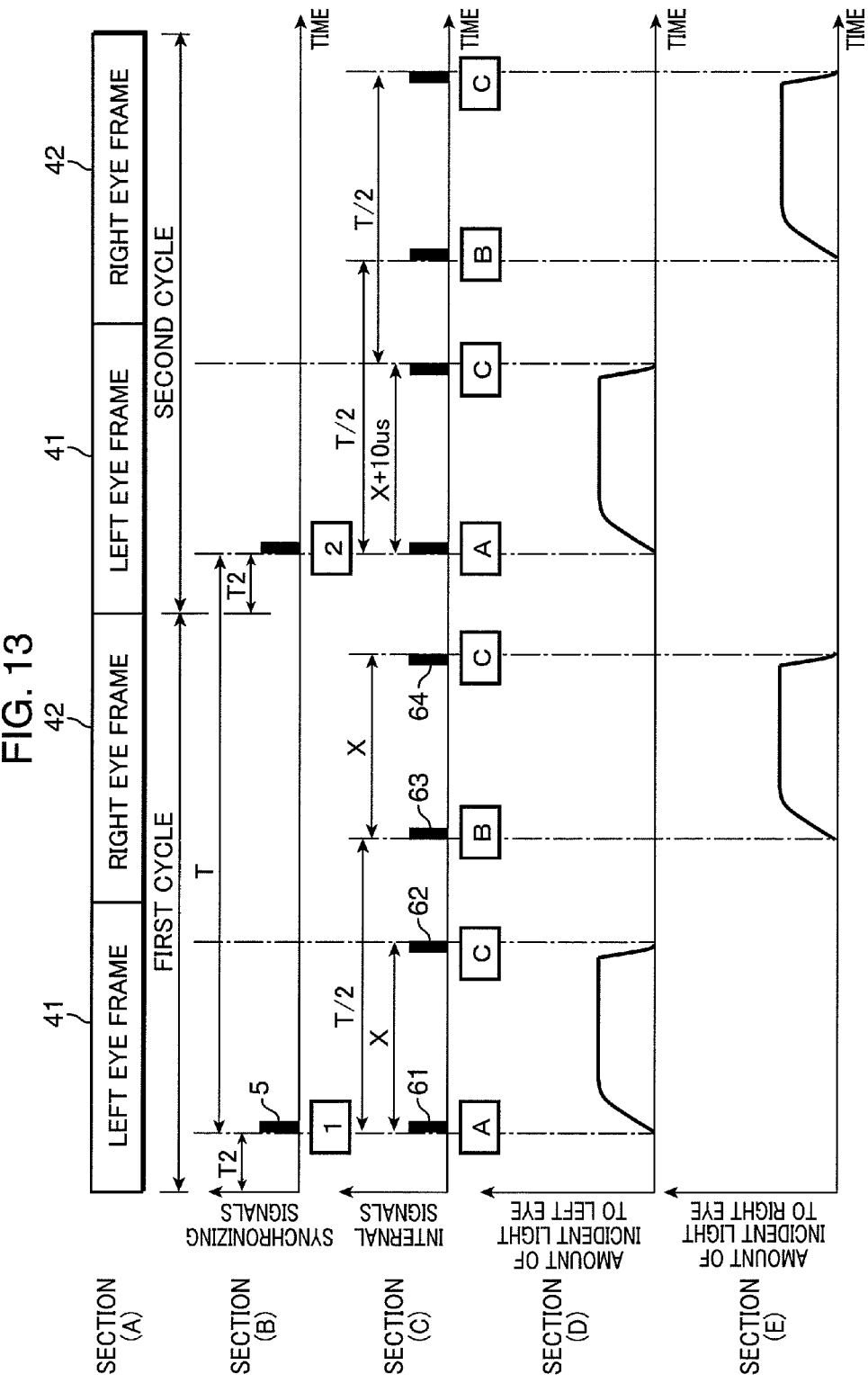
FIG. 13 shows transmission of the synchronizing signal from the display device shown in FIG. 1 and generation of the internal signal based on the synchronizing signal.

FIG. 13 shows a relationship among the frame displayed on the display 210 of the display device 2, the synchronizing signal transmitted from the transmitter 230 of the display device 2, the internal signal generated by the second generator 352 of the eyeglass device 3, and operation of the optical filter portion 330 in the eyeglass device 3. Section (A) of FIG. 13 shows that the display 210 of the display device 2 alternately displays the left eye frame 41 and the right eye frame 42 sequentially. Section (B) indicates that the transmitter 230 of the display device 2 transmits the synchronizing signal in synchronization with the frame 41 displayed by the display 210. Section (C) shows that the internal signal is generated on the basis of the synchronizing signal. Section (D) shows operation of the left eye filter 31 while section (E) shows operation of the right eye filter 32. Control of the optical filter portion 330 is explained with reference to FIGS. 2 to 4 and FIGS. 9 and 10 together with FIG. 13.

The synchronizing signal 5 is transmitted with a delay time T2 after the starting time of each left frame 41 in the same manner as the second embodiment. Two synchronizing signals 5 shown in FIG. 13 have mutually different waveforms which are used for transferring information relating to control of the optical filter portion 330 with the synchronizing signal 5.

The signal waveform described in the context of FIG. 10, for example, may be used as the waveform of the synchronizing signal 5 used in the present embodiment. The signal waveform indicated with reference symbol "1" and the signal waveform indicated with reference symbol "2" shown in FIG. 10D, for example, are used for the synchronizing signals shown in FIG. 13.

The third embodiment is described while additionally referring to FIG. 14 showing exemplary information in the synchronizing signal 5 relating to the control of the optical filter portion 330.

The signal waveform indicated with reference symbol "1" shown in FIG. 10D is a "first signal waveform" shown in FIG. 14. The signal waveform indicated with reference symbol "2" shown in FIG. 10D is a "second signal waveform" shown in FIG. 14. The signal waveform indicated with reference symbol "3" shown in FIG. 10D is a "third signal waveform" shown in FIG. 14. The signal waveform indicated with reference symbol "4" shown in FIG. 10D is a "fourth signal waveform" shown in FIG. 14.

The first signal waveform used in the present embodiment contains information so as to execute control for opening the filters 31 and 32 of the optical filter portion 330 for a predetermined time period (standard period X) after a reception of the synchronizing signal 5. The second signal waveform contains information so as to execute control for opening the filters 31 and 32 of the optical filter portion 330 for 10 μs longer than the standard period X.

In FIG. 13, the second generator 352 of the eyeglass device 3 generates an internal signal 61 used for control to open the left eye filter 31 corresponding to the synchronizing signal 5 received in a first cycle including the preceding displays of the left eye frame 41 and the right eye frame 42. The second generator 352 further generates an internal signal 62 used for control to close the left eye filter 31, the time X after the generation of the internal signal 61. The second generator 352 further generates an internal signal 63 used for control to open the right eye filter 32, a period T/2, which is obtained from the arithmetic processing steps described in the context of FIG. 6, after the generation of the internal signal 61. The second generator 352 further generates an internal signal 64 used for control to close the left eye filter 32, the time X after the generation of the internal signal 63.

The second generator 352 generates the internal signal 61 for control to open the left eye filter 31 corresponding to the synchronizing signal received in the second cycle after the first cycle. The second generator 352 further generates the internal signal 62 used for control to close the left eye filter 31, the time X+10 μs after the generation of the internal signal 61. The second generator 352 further generates the internal signal 63 used for control to open the right eye filter 32, a period T/2, which is obtained from the arithmetic processing steps described in the context of FIG. 6, after the generation of the internal signal 61. The second generator 352 further generates the internal signal 64 used for control to close the left eye filter 32, the time T/2 after the generation of the internal signal 62.

Less frequent communication of the synchronizing signal 5 may be achieved as compared with the second embodiment, which may result in less interference of the synchronizing signal 5. More various control of the optical filter portion 330 may be available according to the third embodiment although more various synchronizing signals are required. Thus, the third embodiment may provide more highly accurate control for the optical filter portion 330 with simplified communication of the synchronizing signal 5 as compared with prior art.

It should be noted that the present invention is not limited to the information relating to the opening times of the optical filter portion 330 with the synchronizing signals 5, which is transferred from the display device 2 to the eyeglass device 3 according to the third embodiment. Alternatively any other information may also be transferred from the display device 2 to the eyeglass device 3 with the synchronizing signal 5. For example, the synchronizing signal 5 may be used to transmit information for identifying whether the display 210 displays three-dimensional images or two-dimensional images. In this case, the optical filter portion 330 is subjected to different control in accordance with the types of the video images displayed by the display 210 (three-dimensional or two-dimensional images).

The present embodiment may establish synchronization between the display device 2 and the eyeglass device 3 through communication of the synchronizing signal 5 with various types of information from the display device 2 to provide preferable control of the optical filter portion 330 based on the information in the synchronizing signals 5.

It should be noted that the present invention is not limited to the synchronizing signal 5 used in the present embodiment as the opening signal corresponding to the internal signal 61 for opening the left eye filter 31 (increasing the amount of the transmitted light). For example, (1) the synchronizing signal 5 may correspond to the internal signal 62 for closing the left eye filter 31 (decreasing the amount of the transmitted light). Alternatively, (2) the synchronizing signal 5 may correspond to the internal signal 63 for opening the right eye filter 32. Alternatively, (3) the synchronizing signal 5 may correspond to the internal signal 64 for closing the right eye filter 32.

The present embodiment may be also preferably use control of the electrical power as described in the context of FIGS. 11 and 12. Thus, a description on control for the electrical power according to the third embodiment is omitted.

Fourth Embodiment

In the fourth embodiment, the optical filter portion 330 is controlled so that operation of the left eye filter 31 during display of the left eye frame 41 and operation of the right eye filter 32 during display of the right eye frame 42 are temporally asymmetrical although, in the first to third embodiments, the operation of the left eye filter 31 during the display of the left eye frame 41 and the operation of the right eye filter 32 during the display of the right eye frame 42 are temporally symmetrical (namely, the time period from the display starting time of the left eye frame 41 to when the left eye filter 31 opens as well as the time period from the display starting time of the left eye frame 41 to when the left eye filter 31 closes are equivalent to the time period from the display starting time of the right eye frame 42 to when the right eye filter 32 opens as well as the time period from the display starting time of the right eye frame 42 to when the right eye filter 32 closes).

Figure 15:
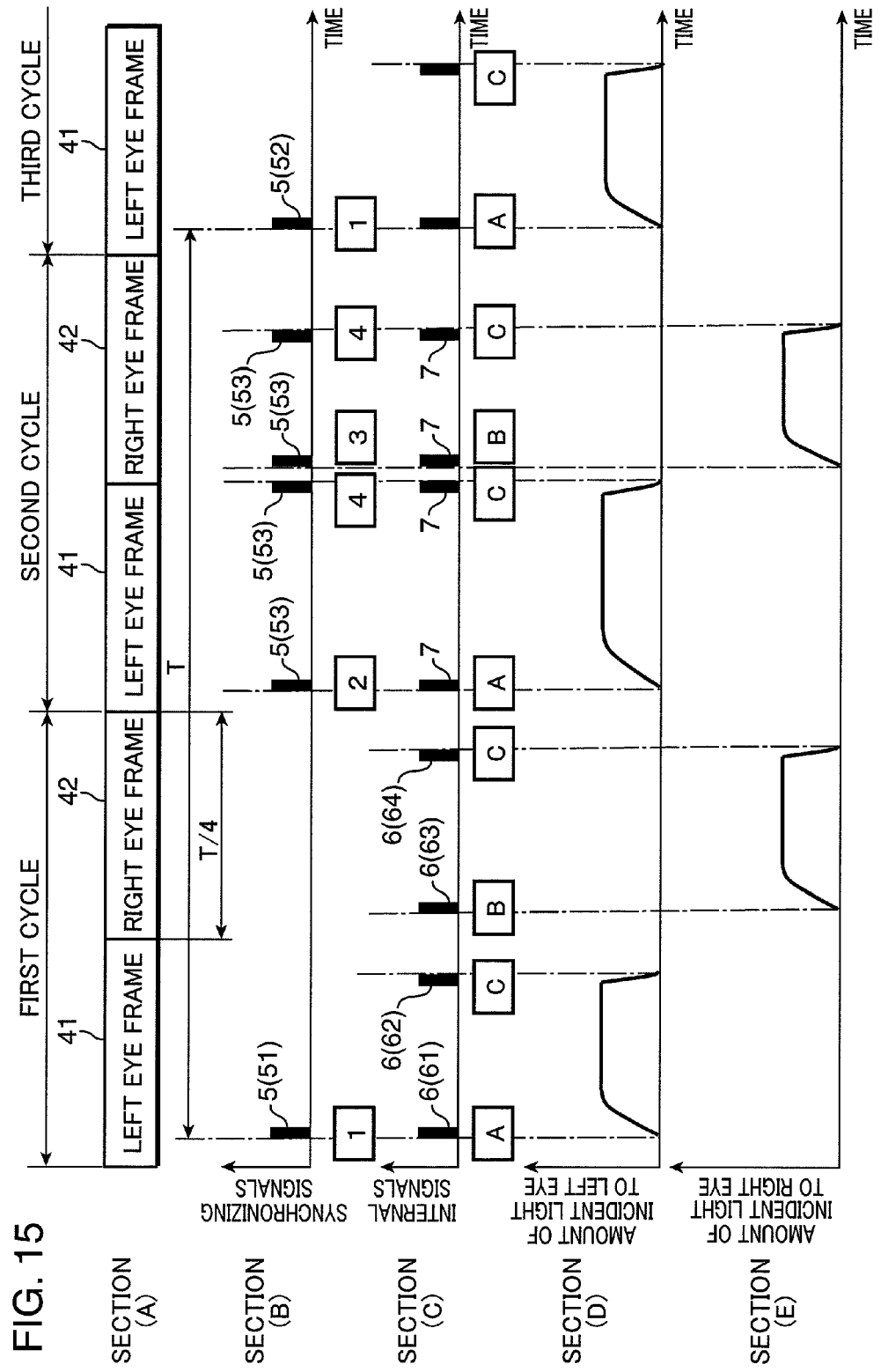
FIG. 15 shows transmission of the synchronizing signal from the display device shown in FIG. 1 and generation of the internal signal based on the synchronizing signal.

FIG. 15 shows a relationship among the frame displayed on the display 210 of the display device 2, the synchronizing signal transmitted from the transmitter 230 of the display device 2, the internal signal 6 generated by the second generator 352 of the eyeglass device 3, and the operation of the optical filter portion 330 of the eyeglass device 3. Section (A) of FIG. 15 shows that the display 210 of the display device 2 alternately displays the left eye frame 41 and the right eye frame 42 sequentially. Section (B) shows that the transmitter 230 of the display device 2 transmits the synchronizing signal in synchronization with the frames 41 and 42 displayed by the display 210. Section (C) shows that the internal signal 6 is generated based on the synchronizing signal. Section (D) shows the operation of the left eye filter 31 while section (E) shows the operation of the right eye filter 32. The control of the optical filter portion 330 is explained with reference to FIGS. 2 to 4 and FIGS. 6 and 10 together with FIG. 15.

The display device 2 transmits a single synchronizing signal 5 during a first cycle including the left eye frame 41 and the right eye frame 42, which are displayed ahead, and the eyeglass device 3 generates four internal signals 6. Communication between the display device 2 and the eyeglass device 3 and the control of the eyeglass device 3 during the first cycle are the substantially same as those of the third embodiment. In the first cycle, the transmitted synchronizing signal 5 has, for example, a first waveform indicated with reference symbol "1" in FIG. 10D. The second generator 352 of the eyeglass device 3 generates, on the basis of the synchronizing signal 5, an internal signal 61 used for control to open the left eye filter 31, an internal signal 62 used for control to close the left eye filter 31, an internal signal 63 used for control to open the right eye filter 32, and an internal signal 64 used for control to close the right eye filter 32 in the same manner as the third embodiment.

The transmitter 230 of the display device 2 transmits four synchronizing signals 5 in the second cycle after the first cycle. The synchronizing signals 5 transmitted during the second cycle are second synchronizing signals 53. After the reception of the second synchronizing signals 53, the second generator 352 of the eyeglass device 3 generates an individual synchronizing signal 7 corresponding to each of the second synchronizing signals 53. The second synchronizing signals 53 have a waveform different from that of the first synchronizing waveform 5 transmitted during the first cycle. For example, the preceding second synchronizing signal 53 has the waveform indicated with reference symbol "2" shown in FIG. 10D during the display period of the left eye frame 41 in the second cycle. The subsequently transmitted second synchronizing signal 53 has the waveform indicated with reference symbol "4" shown in FIG. 10D during the display period of the left eye frame 41 in the second cycle. The preceding second synchronizing signal 53 has the waveform indicated with reference symbol "3" shown in FIG. 10D during the display period of the right eye frame 42 in the second cycle. The subsequently transmitted second synchronizing signal 53 has the waveform indicated with reference symbol "4" shown in FIG. 10D during the display period of the right eye frame 42 in the second cycle. The analyzer 351 of the eyeglass device 3 records waveform data of the second synchronizing signals 53 along with reception time data of the second synchronizing signals 53 in the storage 360.

The second generator 352 of the eyeglass device 3 generates the individual internal signals 7 in synchronization with the second synchronizing signals 53 based on the waveform data of the second synchronizing signals 53 and reception time data of the second synchronizing waveforms 53 recorded in the storage 360. The second generator 352 generates an individual internal signal 7 used for control to open the left eye filter 31 by retrieving data on the waveform indicated with reference symbol "2" shown in FIG. 10D from the storage 360. The second generator 352 generates an individual internal signal 7 used for control to open the right eye filter 32 by retrieving data on the waveform indicated with reference symbol "3" shown in FIG. 10D from the storage 360. The second generator 352 generates an individual internal signal 7 used for control to close the optical filter portion 330 (left eye filter 31 and/or right eye filter 32) by retrieving data on the waveform indicated with reference symbol "4" shown in FIG. 10D from the storage 360. The second generator 352 adjusts the generation times of these individual internal signals 7 based on data about the reception times of the second synchronizing signals 53.

As shown in section (D) and section (E) of FIG. 15, the controller 353 controls the optical filter portion 330 based on the internal signals 6 and the individual internal signals 7. The second synchronizing signals 53 may also be transmitted in the case of excessively strong afterglow of the left eye frame 41 and/or the right eye frame 42 during the second cycle or any other conditions requiring the asymmetry operation between the left eye filter 31 during display of the left eye frame 41 and the right eye filter 32 during display of the right eye frame 42. For example, the first generator 262 may generate a second synchronizing signal 53 when the L/R signal separator 260 and/or the 3D signal processor 261 of the display device 2 determines there is a relatively bright spot in a relatively dark background in the left eye frame 41 and/or the right eye frame 42.

The arithmetic processing described in the context of FIG. 6 is preferably executed in the present embodiment. For example, the synchronizing signal 5 transmitted during the first cycle is used as the preceding first synchronizing signal 51 while the synchronizing signal 5 transmitted during the third cycle after the second cycle is used as the subsequent first synchronizing signal 52. The first synchronizing signals 51 and 52 may have, for example, the first signal waveform indicated with reference symbol "1" shown in FIG. 10D.

As described in the context of FIG. 6, the analyzer 351 of the eyeglass device 3 determines that the first synchronizing signals 51 and 52 have the same waveform by retrieving the waveforms of these synchronizing signals 51 and 52. The analyzer 351 then calculates the display cycle T based on the reception times of the first synchronizing signals 51 and 52. The analyzer 351 may determine that the second synchronizing waveform 53 is received between the receptions of the first synchronizing signals 51 and 52 based on the waveform and the reception time of the second synchronizing signal 53. Thus, the analyzer 351 may calculate the display time of each frame in consideration of the cycle during which the second synchronizing signals 53 are received. For example, in the case a single cycle (second cycle) during which the second synchronizing signal 53 is received is present between the reception of the preceding first synchronizing signal 51 and the reception of the subsequent first synchronizing signal 52 as shown in FIG. 15, the analyzer 351 may calculate a period equal to one-fourth the calculated display cycle T for the display time of each frame (left eye frame 41 and right eye frame 42). Thus, the fourth embodiment may preferably provide symmetric control between the left eye filter 31 and the right eye filter 32 as described in the third embodiment.

Figure 16:
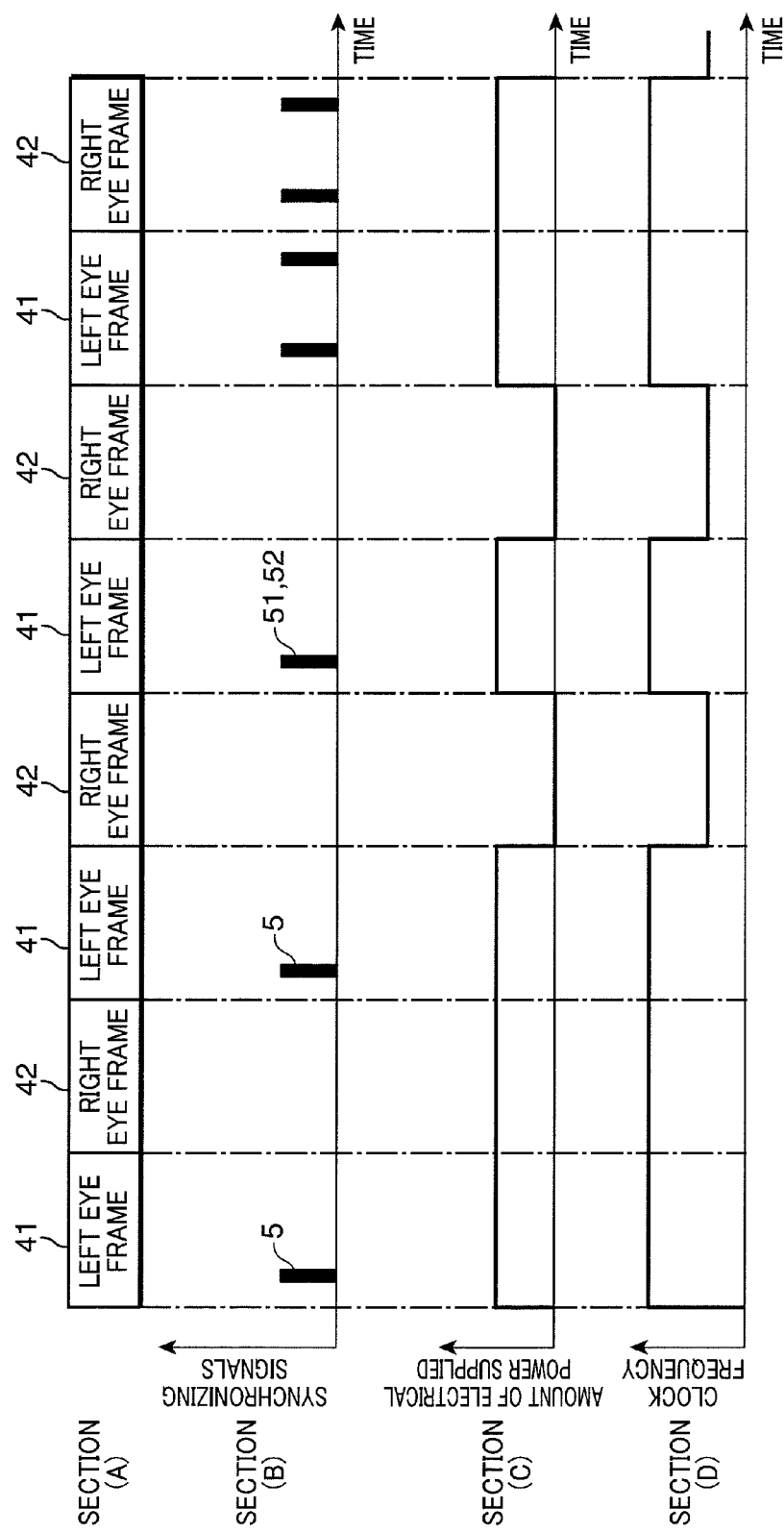
FIG. 16 shows power supply control based on the synchronizing signal shown in FIG. 15.

FIG. 16 shows control of electrical power based on the communication of the synchronizing signal 5 as described in the context of FIG. 15. The control of the electrical power with the synchronizing signal 5 is explained with reference to FIG. 15 together with FIG. 16.

Section (A) of FIG. 16 shows that the display 210 of the display device 2 alternately displays the left eye frame 41 and the right eye frame 42 sequentially. Section (B) shows that the transmitter 230 of the display device 2 transmits the synchronizing signal 5 in synchronization with the left eye frame 41 displayed by the display 210. Section (C) shows a change in the amount of the electrical power supplied to the receiver 340 of the eyeglass device 3 based on the synchronizing signal 5 from the display device 2. Section (D) shows a change in the clock frequency of the CPU 35 in the eyeglass device 3.

As aforementioned, immediately after activation of the eyeglass device 3 or during continuous unsuccessful reception of the synchronizing signal 5, the power supply portion 300 of the eyeglass device 3 continuously supply the electrical power to the receiver 340 until at least two synchronizing signals 5, of which waveforms matches each other, are received in consecutive cycles, each of which includes the left eye frame 41 and the right eye frame 42. After the reception of the at least two synchronizing signals 5 with equivalent waveforms, the power supply portion 300 interrupts the electrical power supply to the receiver 340 during the period for displaying a frame (the right eye frame 42), for which it is determined the reception of the synchronizing signal 5 is not required.

The power supply portion 300 interrupts the electrical power supply to the receiver 340 during the display period of the right eye frame 42 when the preceding first synchronizing signal 51 and/or the subsequent first synchronizing signal 52 are received during the display period of the left eye frame 41. When the second synchronizing signal 53 is received during the display time of the left eye frame 41, the power supply portion 300 continues to supply electrical power to the receiver 340 during the display period of the right eye frame 42 in continuation from the display period of the left eye frame 41 as shown in FIG. 16. In addition, the clock frequency of the CPU 35 during the display period of the right eye frame 42 is lower than the clock frequency during the display period of the left eye frame 41 after the preceding first synchronizing signal 51 and/or the subsequent first synchronizing signal 52 are received during the display period of the left eye frame 41. The clock frequency of the CPU 35 during the display period of the right eye frame 42 maintains the substantially same level as the clock frequency during the display period of the left eye frame 41 if the second synchronizing signal 53 is received during the display period of the left eye frame 41. As a result, the conservation by the eyeglass device 3 as well as the reception and the processing for the synchronizing signals 5 are preferably achieve.

In this manner, the present embodiment may establish preferable synchronization between the display device 2 and the eyeglass device 3 by combining symmetrical and asymmetrical control between the left eye filter 31 and the right eye filter 32 using relatively simple communication of the synchronizing signals 5.

Fifth Embodiment

In this embodiment, the display 210 of the display device 2 displays a first video image (two-dimensional image) and a second video image (two-dimensional image) with mutually different contents instead of three-dimensional images. A viewer may selectively view the first video image and the second video image, for example, by operating a switch 391 (see FIG. 1) provided on a frame 390 of the eyeglass device 3.

Figure 17:
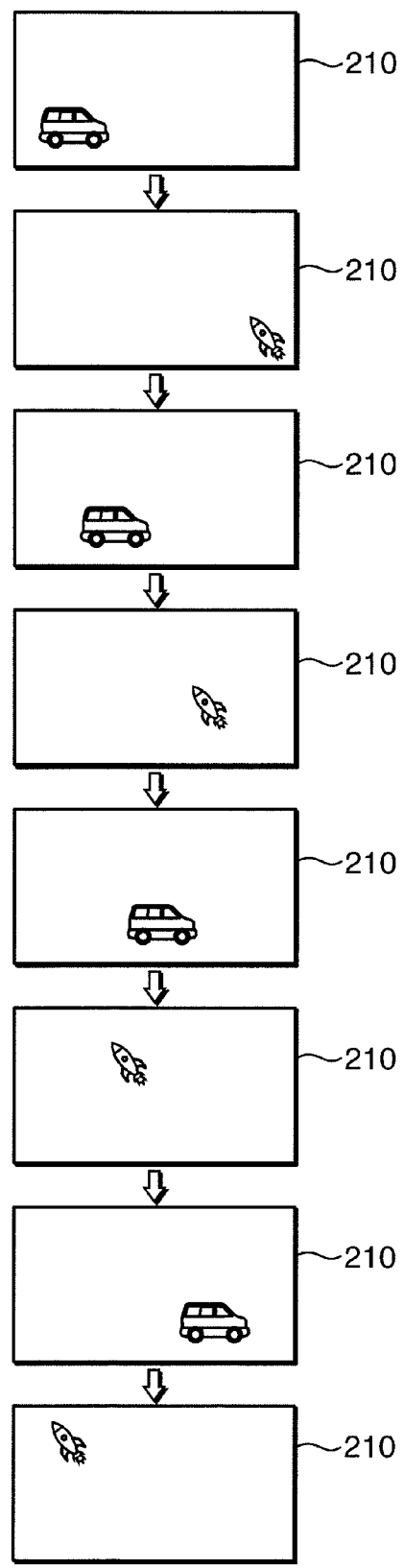
FIG. 17 shows the video image displayed by the display device shown in FIG. 1.

FIG. 17 shows exemplary video images displayed by the display 210 of the display device 2. In FIG. 17, a two-dimensional image of a "car" is shown as the first video image while a two-dimensional image of a "rocket" is shown as the second video image. The video signal processing IC 26 of the display device 2 shown in FIG. 2 alternately arranges frames of the first video image and frames of the second video image and displays them on the display panel 21 (display 210).

Figure 18:
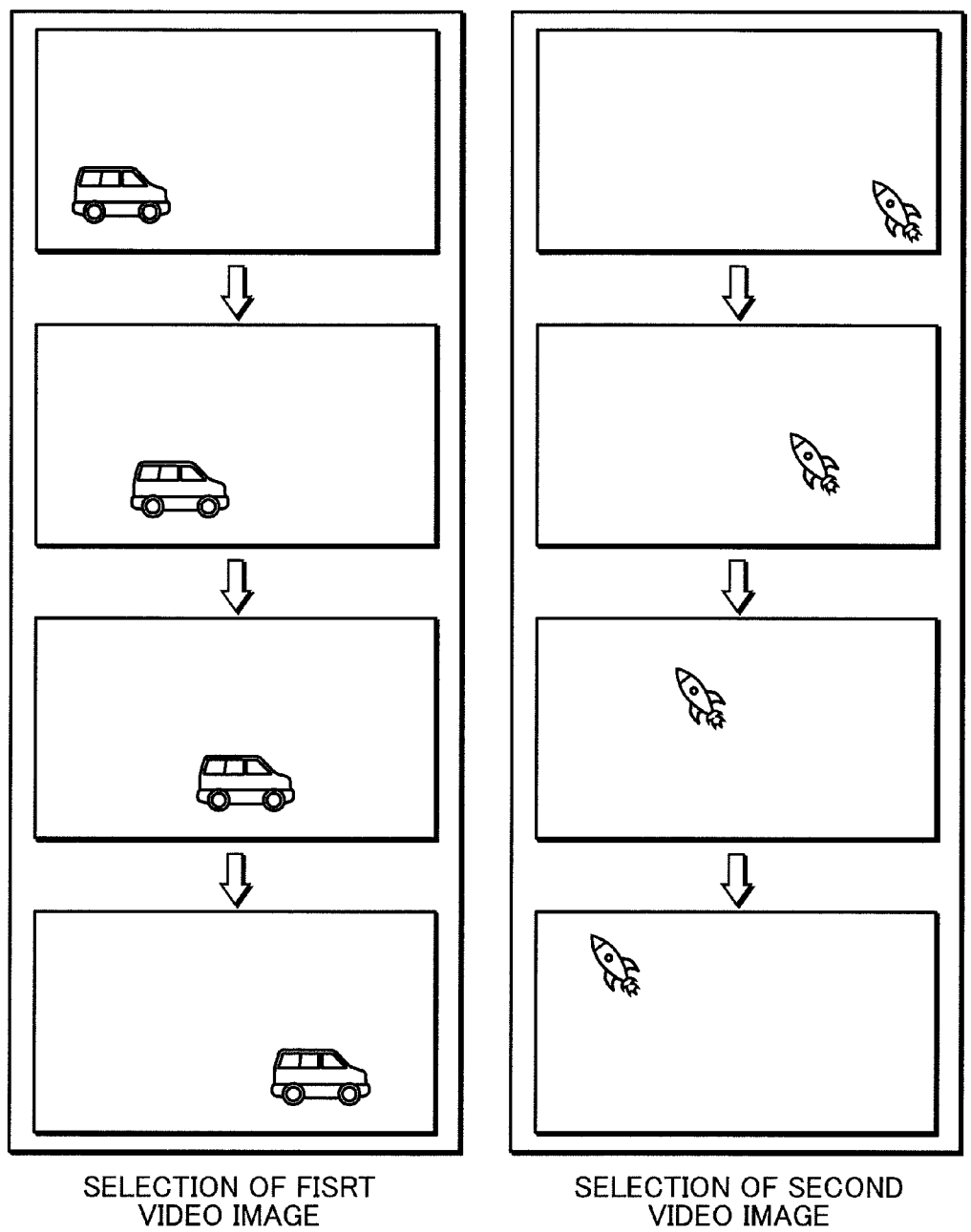
FIG. 18 shows the video image to be viewed in accordance with a selection made by a viewer.

FIG. 18 shows the exemplary video images selectively viewed from one of the video images including the first video image and the second video image shown in FIG. 17. As shown in FIG. 18, the two-dimensional image of the "car" may be viewed when a viewer selects the first video image while the two-dimensional image of the "rocket" may be viewed when a viewer selects the second video image. In the following description, frames of the first video image are referred to as a first frame while frames of the second video image are referred to as a second frame.

Figure 19:
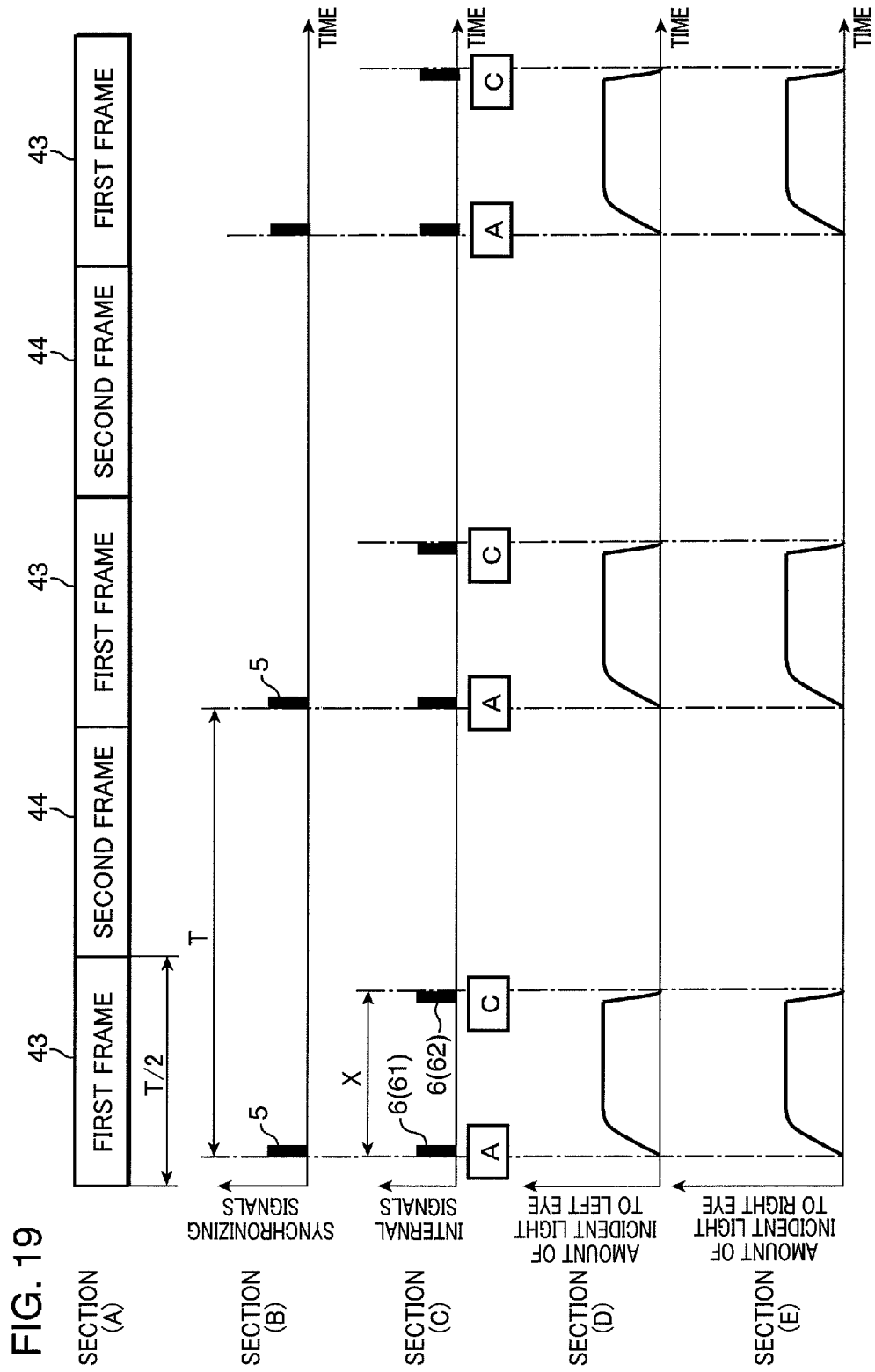
FIG. 19 shows control for the eyeglass device when the video images shown in FIGS. 17 and 18 are displayed.

FIG. 19 shows a relationship among frames displayed on the display 210 of the display device 2, the synchronizing signal transmitted from the transmitter 230 of the display device 2, the internal signal generated by the second generator 352 of the eyeglass device 3, and the operation of the optical filter portion 330 in the eyeglass device 3. Section (A) of FIG. 19 indicates that the display 210 of the display device 2 alternately displays a first frame 43 and a second frame 44 sequentially. Section (B) indicates that the transmitter 230 of the display device 2 transmits the synchronizing signal 5 in synchronization with the frame 43 displayed by the display 210. Section (C) shows the internal signal 6 generated on the basis of the synchronizing signal 5. Section (D) shows the operation of the left eye filter 31 while section (E) shows the operation of the right eye filter 32. The control of the optical filter portion 330 is explained with reference to FIGS. 2 to 4 and FIGS. 13 and 14 together with FIG. 19.

As shown in FIG. 19, the display 210 of the display device 2 alternately displays the first frame 43 and the second frame 44.

The transmitter 230 of the display device 2 transmits the synchronizing signal 5 to the receiver 340 corresponding to the first frame 43. The analyzer 351 of the eyeglass device 3 calculates the display cycle T with the arithmetic processing steps described in the context of FIG. 6. In addition, the analyzer 351 of the eyeglass device 3 calculates the display time (=T/2) of each frame 43 and 44 based on the calculated display cycle T. The analyzer 351 of the eyeglass device 3 records these calculation results in the storage 360.

When a viewer selects the first video image, the second generator 352 of the eyeglass device 3 generates the internal signal 6 as shown in section (C) of FIG. 19. The internal signal 6 generated ahead during the display of the first frame 43 is an internal signal 61 used for control to open both the left eye filter 31 and the right eye filter 32 while an internal signal 62 used for control to close both the left eye filter 31 and the right eye filter 32. The internal signal 61 is generated at the substantially same time as the reception of the synchronizing signal 5 while the internal signal 62 is generated, a time X after the generation of the internal signal 61. The time interval X between the internal signals 61 and 62 is determined, for example, on the basis of data on the signal waveform of the synchronizing signal 5 as described in the context of FIGS. 13 and 14.

Figure 20:
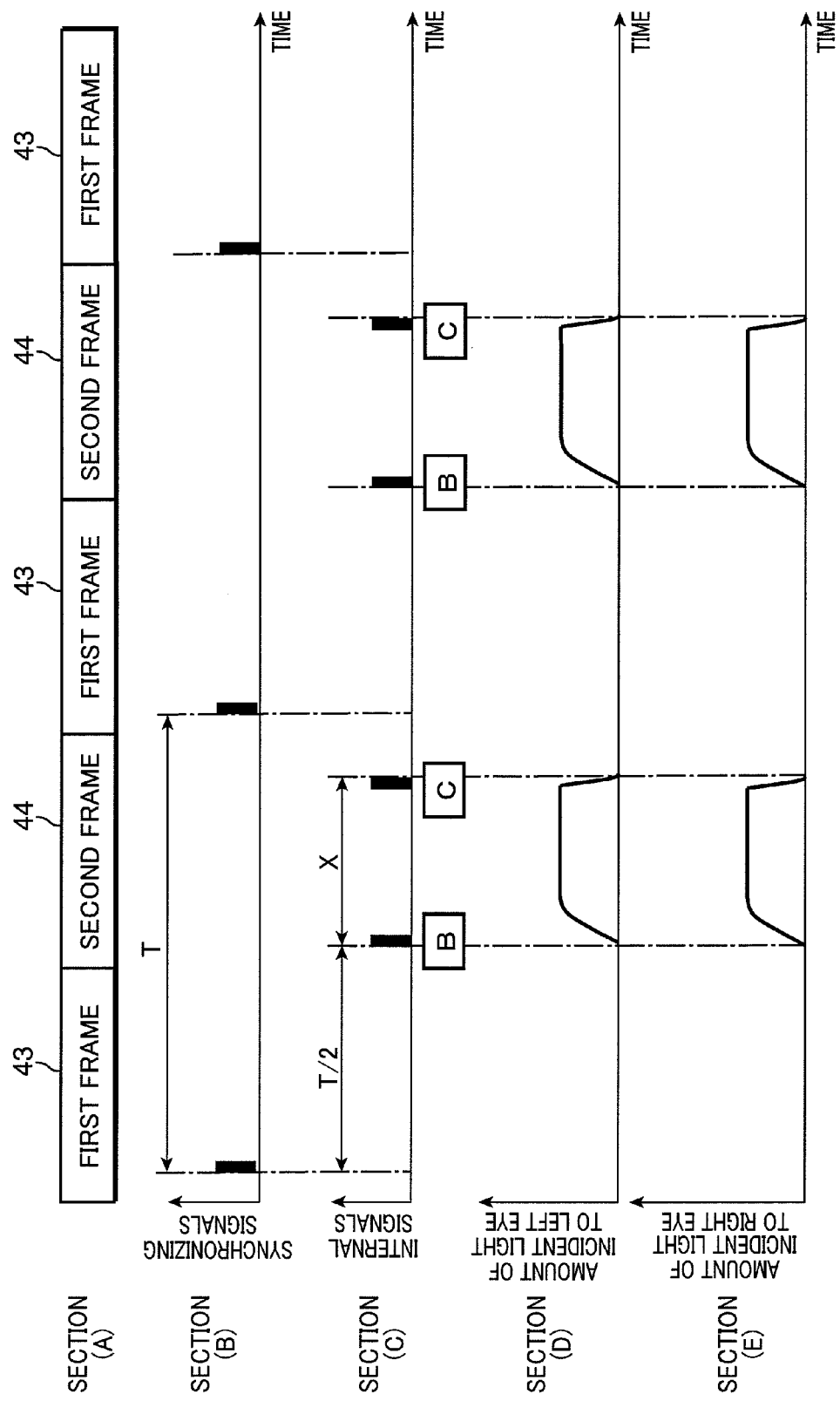
FIG. 20 shows control for the eyeglass device when the video images shown in FIGS. 17 and 18 are displayed.

FIG. 20 shows the generation of the internal signal 6 when the second video image is selected by a viewer. Section (C) of FIG. 20 indicates the generation of the internal signal 6 based on the synchronizing signal 5 when the second video image is selected. Sections (A), (B), (C) and (D) of FIG. 20 are respectively similar to sections (A), (B), (C) and (D) of FIG. 19. The generation of the internal signal 6 based on the synchronizing signal 5 is further described by additionally referring to FIG. 20.

If the second video image is selected, the generation of the internal signal 61 by the second generator 352 of the eyeglass device 3 may delay by the display time of one frame (T/2) from the reception time of the synchronizing signal 5. The generation of the internal signal 62 may delay by a time X from the generation time of the internal signal 61.

The controller 353 of the eyeglass device 3 controls the optical filter portion 330 in accordance with the internal signals 61 and 62. Thus, when a viewer selects the first video image, the left eye filter 31 and the right eye filter 32 begin to open at the substantially same time as the reception of the synchronizing signal 5, and begin to close, a time X after the reception of the synchronizing signal 5. When a viewer selects the second video image, the left eye filter 31 and the right eye filter 32 begin to open, a time T/2 after the reception of the synchronizing signal 5 and begin to close, a time X after the start of the opening operation of the left eye filter 31 and the right eye filter 32. Section (D) and section (E) of FIGS. 19 and 20 shows increases and decreases in the amount of the light passing through the left eye filter 31 and the right eye filter 32 resulting from the operation of the optical filter portion 330 as described above.

It should be noted that the present invention is not limited to two independent video images used in the present embodiment. A viewer may selectively view a desired video image from three or more independent video images. For example, the display 210 of the display device 2 may sequentially display a first frame, a second frame and a third frame, and may open the left eye filter 31 and/or the right eye filter 32 during the display time of the frame selected by the viewer (to increase the amount of the transmitted light). Thus, the present invention is not limited by the number of video images, and includes all video images selectively viewable among a plurality of video images.

As aforementioned, the present embodiment may be preferably applicable to selectively view a plurality of two-dimensional images, which are not three-dimensional images, and may preferably provide less frequent communication of the synchronizing signal 5 between the display device 2 and the eyeglass device 3. Thus, the present embodiment may establish the synchronous communication between the display device 2 and the eyeglass device 3 with simpler communication of the synchronizing signal 5 than the prior art.

It should be noted that the present invention is not limited to the synchronizing signals at the display starting time of the first frame 43 transmitted from the display device 2 to the eyeglass device 3 in the present embodiment. For example, (1) the display device 2 may transmit the synchronizing signal 5 at the display ending time of the first frame 43, (2) the display device 2 may transmit the synchronizing signal 5 at the display starting time of the second frame 44, or (3) the display device 2 may transmit the synchronizing signal 5 at the display ending time of the second frame 44.

It should be noted that a viewer may select a two-dimensional image from a plurality of two-dimensional images or a three-dimensional image to be viewed as desired if the synchronizing signal 5 includes information to distinguish between the two dimensional image and the three-dimensional image, combining the present embodiment with the third embodiment.

Sixth Embodiment

In this embodiment, the display device 2 intermittently transmits a synchronizing signal group including a plurality of the synchronizing signals 5. The potential interference is further reduced in the present embodiment although less frequent communication of the synchronizing signal 5 as well as less potential interference with a signal from external equipment (such as a remote controller provided with the display device 2) are preferable achieved according to the aforementioned embodiments. An exemplary condition for the interference may be a data transmission with an infrared light to the display device 2 from its remote controller (not shown) to turn the display device 2 on and off or to operate the display device 2 in a specific manner, which result in an interference between the infrared light from the remote controller and the infrared light used for the communication of the synchronizing signal 5 from the display device 2 to the eyeglass device 3.

FIG. 21 shows the data transmission by a remote controller. The intermittent transmission of the synchronizing signal 5 is described with reference to FIGS. 2 to 4 together with FIG. 21.

A transmission period D shown in FIG. 21A indicates a period during which data is transmitted from a remote controller to the display device 2. The transmission period D is set as shown in FIG. 21B, for example. The remote controller transmits the same data set several times to communicate certain information. In FIG. 21B, the remote controller transmits the same data set 81, 82 and 83 three times during the transmission period D. The remote controller provides a fixed non-transmission period between one data transmission and the subsequent data transmission. As a result, the display device 2 may execute processing such as identifying a boundary between the preceding data set and the subsequent data set.

If the transmission period D of data from the remote controller as described above overlaps with transmission timing of the synchronizing signal 5 from the display device 2 to the eyeglass device 3, the eyeglass device 3 may not properly receive the synchronizing signal 5. Adjustment for the transmission timing of the synchronizing signal 5 from the display device 2 to the eyeglass device 3 in the present embodiment is achieved in the manner described below.

The transmission controller 270 of the display device 2 preliminarily accumulates information on the transmission period D of the remote controller. According to FIG. 21, the transmission controller 270 preliminarily retains time information on the data transmission period D of the remote controller. The transmission controller 270 controls the transmission of the synchronizing signal 5 to the eyeglass device 3 in accordance with the time length of the transmission period D.

A synchronizing signal group 500 exemplified in FIG. 21C includes a plurality of the synchronizing signals 5. As exemplified in FIG. 21C, the transmitter 230 transmits the subsequent synchronizing signal group 500, a prescribed length of time (transmission interruption period) after the transmission of the preceding synchronizing group 500 under the control of the transmission controller 270. The control may be defined so that it takes twice or more as long as the data transmission period D of the remote controller to transmit a synchronizing signal group after the transmission of the preceding the synchronizing signal group. As a result, data of the synchronizing signals 5 is less likely to overlap with the data of the remote controller.

The synchronizing signal group 500 includes a plurality of the synchronizing signals 5 to be transmitted during a plurality of the display cycles each of which includes the left eye frame 41 and the right eye frame 42 as shown in FIG. 21D. The synchronizing signal group 500 shown in FIG. 21D includes a plurality of synchronizing signals 5 to be transmitted in two display cycles. It should be noted that there are no particular limitations on the number of the synchronizing signals 5 in the synchronizing signal group 500 if it is two or more as described in the context of FIG. 6.

It should be noted that larger transmission interval with which the synchronizing signal groups 500 are transmitted with respect to the transmission period of the data from the remote controller results in less probability of the interference between the data of the synchronizing signal group 500 and the data from the remote controller. The transmission interval of the synchronizing signal group 500 is dependent on an information amount of the synchronizing signal 5 required to generate the internal signal 6 and an time length required for transmitting the synchronizing signal group 500. If it takes extremely long to transmit the synchronizing group 500, the transmission of the synchronizing group 500 is more likely to overlap with the data transmission from the remote controller.

The transmission controller 270 determines the transmission interval of the synchronizing signal group 500 based on the various information described above to make the transmitter 230 transmit the synchronizing signal group 500 at the determined transmission interval. It should be noted that the eyeglass device 3 is controlled on the basis of the internal signal 6 generated by the second generator 352 as aforementioned from the transmission of the preceding synchronizing signal group 500 to the transmission of the subsequent synchronizing signal group 500. In the following description, the transmission period of the synchronizing signal group 500 is referred to as a first display period while the period during which the synchronizing signal group 500 is not transmitted is referred to as a second display period.

FIG. 22 shows control of the electrical power using the synchronizing signal 5 from the display device 2. The control of the electrical power with the synchronizing signal 5 is explained with reference to FIGS. 2 to 4 and FIGS. 9 and 12 together with FIG. 22.

Section (A) of FIG. 22 shows that the display 210 of the display device 2 alternately displays the left eye frame 41 and the right eye frame 42 sequentially. Section (B) shows that the transmitter 230 of the display device 2 transmits the synchronizing signal 5 in synchronization with the left eye frame 41 displayed by the display 210. Section (C) shows a change in the amount of the electrical power supplied to the receiver 340 of the eyeglass device 3 based on the synchronizing signal 5 from the display device 2. Section (D) shows a change in the clock frequency of the CPU 35 in the eyeglass device 3.

As shown in section (A) of FIG. 22, the display 210 alternately displays the left eye frame 41 and the right eye frame 42 twice during the first display period. During the second display period, the display 210 alternately displays the left eye frame 41 and the right eye frame 42 twice as in the first display period.

During the first display period, the transmitter 230 of the display device 2 transmits two synchronizing signals 5 while the display 210 displays each left eye frame 41. Furthermore, transmission of the synchronizing signal 5 during the first display period and generation of the internal signal 6 based on the synchronizing signal 5 is the same as that described in the context of FIG. 9.

As described in the context of FIG. 12, the analyzer 351 of the eyeglass device 3 may calculate a predicted period (from time "$t_1$" to time "$t_2$"), which is a predicted reception time of the subsequent synchronizing signal 5 by using the above-mentioned equations 15 and 16 or the above-mentioned equations 19 and 20. The analyzer 351 records the calculated time "$t_1$" and time "$t_2$" in the storage 360. The power supply portion 300 supplies the electrical power to the receiver 340 during the period from time "$t_1$" to time "$t_2$".

The analyzer 351 further determines whether or not the synchronizing signal 5 is received from time "$t_1$" to time "$t_2$". If the synchronizing signal 5 is received from time "$t_1$" to time "$t_2$", the analyzer 351 determines it is the first display period, and then the power supply portion 300 supplies the electrical power to the receiver 340 during the period at which the subsequent synchronizing signal 5 is predicted to be received. On the other hand, when a synchronizing signal 5 is not received from time "$t_1$" to time "$t_2$", the analyzer 351 determines it is the second display period, and then the power supply portion 300 interrupts the electrical power supply to the receiver 340 while the display 210 shows the left eye frame 41 and the subsequent right eye frame 42 after the predicted period. After that, the power supply portion 300 supplies the electrical power to the receiver 340 at a predicted period calculated for a new left eye frame 41 (period from time "$t_1$" to time "$t_2$") to be displayed, and the analyzer 351 again determines whether it is the first display period or the second display period. In the present embodiment, the clock frequency of the CPU 35 is increased or decreased in synchronization with periods during which the electrical power is supplied by the power supply portion 300 in the same manner as described in the context of the other embodiments.

The storage 360 of the eyeglass device 3 may also preliminarily store a threshold value for the power interruption period. The analyzer 351 determines whether or not a consecutive power interruption period exceeds the threshold value preliminarily stored in the storage 360. When the analyzer 351 determines that the consecutive power interruption period exceeds the threshold value preliminarily stored in the storage 360, the power supply portion 300 may continuously supply electrical power to the receiver 340 to receive synchronizing signal 5 until a completion of the arithmetic processing described in the context of FIG. 6

Thus, less consumption of the electrical power by the eyeglass device 3 may be preferably achieved during the second display period during which the synchronizing signal 5 is not transmitted under the intermittent transmission of the synchronizing signal 5 according to the present embodiment.

The first to sixth embodiments achieves less various synchronizing signals 5 and less frequent communication of the synchronizing signal 5. Less various synchronizing signals 5 may relatively simplifies the controls for the display device 2 and the eyeglass device 3. In addition, less frequent communication of the synchronizing signal 5 may result in less potential interference with other equipment.

During a period in which no synchronizing signal 5 is not received (such as the period during which the right eye frame 42 is displayed according to the first embodiment), the power supply portion 300 of the eyeglass device 3 interrupts the electrical power supply to the receiver 340. Alternatively, the power supply portion 300 of the eyeglass device 3 decreases the amount of the electrical power supplied to the receiver 340. As a result, less power consumption by the eyeglass device 3 may be achieved. As aforementioned, conservation of the electrical power by the eyeglass device 3 is preferably achieved in any of the first to sixth embodiments.

It should be noted that the present invention is not limited to the display device 2 and the eyeglass device 3 shown in the first to sixth embodiments. For example, the display device 2 and the eyeglass device 3 may also be realized using a program with a CPU. In this case, for example, the processing content by the decoding signal IC 25, the video signal processing IC 26, the transmission control IC 27, the CPU 28 and the CPU 35 shown in the context of FIG. 2 are realized in the form of a program run by the CPU.

It should be understood that the descriptions relating to the display device 2 and the eyeglass device 3 in the first to third embodiments also discloses their control methods for a skilled person to practice them. The control methods for the display device 2 and the eyeglass device 3 are not limited to the hardware configuration in the above-mentioned descriptions. Thus, the control method may be applicable to any suitable devices capable of realizing the control methods in the above-mentioned descriptions.

The aforementioned specific embodiments may mainly include the following configurations.

A video system according to one aspect of the above-mentioned embodiments is provided with a display device configured to display a video image including a first video image and a second video image and an eyeglass device configured to assist a viewer in viewing the video image. The display device includes a display portion configured to display the first video image and the second video image in a prescribed order; a first generation portion configured to generate a synchronizing signal in synchronization with the first video image; and a transmission portion configured to transmit the synchronizing signal to the eyeglass device. The eyeglass device includes a reception portion configured to receive the synchronizing signal; a second generation portion configured to generate an internal signal in synchronization with the second video image, based on the synchronizing signal; an optical filter portion configured to adjust amounts of incident light to a left eye and a right eye, respectively; and a control portion configured to control the optical filter portion based on the internal signal.

According to the above-mentioned configuration, the display device displays the video image including a first video image and a second video image. In addition, the eyeglass device assists the viewer in viewing the video image. The display portion displays the first video image and the second video image in a prescribed order. The first generation portion generates a synchronizing signal in synchronization with the first video image. The transmission portion transmits the synchronizing signal to be received by the reception portion. The second generation portion generates an internal signal in synchronization with the second video image, based on the synchronizing signal. The control portion may control the optical filter portion based on the internal signals. Thus, the configuration above-described may not require communication of the synchronizing signal corresponding to the second video image, which may result in a simplified signal processing and less interference of the synchronizing signal used for the communication.

In the above-mentioned configuration, the first video image includes a first frame containing one of a left eye frame configured to be viewed by the left eye of the viewer and a right eye frame configured to be viewed by the right eye of the viewer, and the second video image includes a second frame containing another of the left eye frame and the right eye frame.

According to the above-mentioned configuration, the first video image includes the first frame containing one of the left eye frame and the right eye frame while the second video image includes a second frame containing another of the left eye frame and right eye frame. Thus, the viewer may three-dimensionally perceive the video image.

In the above-mentioned configuration, the eyeglass device further includes an analysis portion configured to calculate a display time of the first frame and a display time of the second frame, the synchronizing signal includes a plurality of first synchronizing signals, the analysis portion calculates the display time of the first frame and the display time of the second frame based on a reception interval between the first synchronizing signal received ahead and the first synchronizing signal subsequently received under a condition that the display time of the first frame and the display time of the second frame are equivalent, and the second generation portion generates the internal signal based on the display times calculated by the analysis portion.

According to the above-mentioned configuration, the analysis portion calculates the display time of the first frame and the display time of the second frame based on the reception interval of the first synchronizing signals, under the condition that the display time of the first frame and the display time of the second frame are equivalent. The second generation portion generates the internal signal based on the display times calculated by the analysis portion. Thus, the optical filter portion may be preferably controlled without the synchronizing signal in synchronization with the second frame, which may result in relatively less frequent communication of the synchronizing signal.

In the above-mentioned configuration, the eyeglass device includes a power supply portion, and the power supply portion supplies an electrical power to the reception portion during the display time of the first frame and interrupts supplying the electrical power to the reception portion during the display time of the second frame.

According to the above-mentioned configuration, the eyeglass device may preferably receive the synchronizing signal because the power supply portion supplies the electrical power to the reception portion during the display period of the first frame. Furthermore the above-mentioned configuration may achieve less power consumption because the power supply portion interrupts supplying the electrical power to the reception portion during the display period of the second frame. In addition, the interruption the electrical power supply during the display period of the second frame may not affect the control of the optical filter portion because the reception portion receives no synchronizing signal during the display period of the second frame.

In the above-mentioned configuration, the power supply portion supplies the electrical power to the reception portion until there are the first synchronizing signal received ahead and the first synchronizing signal subsequently received.

According to the above-mentioned configuration, the eyeglass device may preferably receive the synchronizing signal until a sufficient number of the synchronizing signals for the calculation of the display time of the first frame and the display time of the second frame by the analysis portion are received because the power supply portion supplies the electrical power to the reception portion until there are the first synchronizing signal received ahead and the first synchronizing signal subsequently received.

In the above-mentioned configuration, the analysis portion includes a CPU operable at a first clock frequency and a second clock frequency that is lower than the first clock frequency, and the CPU operates at the first clock frequency while the first frame is displayed and operates at the second clock frequency while the second frame is displayed.

According to the above-mentioned configuration, lower second clock frequency of the CPU while the second frame is displayed than the first clock frequency of the CPU while the first frame is displayed may result in less power consumption by the eyeglass device.

In the above-mentioned configuration, the synchronizing signal includes a second synchronizing signal with a different waveform from that of the first synchronizing signal, and the second generation portion generates an individual internal signal in synchronization with reception of the second synchronizing signal if the second synchronizing signal is received between the first synchronizing signal received ahead and the first synchronizing signal subsequently received, and the control portion controls the optical filter portion in synchronization with the individual internal signal.

According to the above-mentioned configuration, when the second synchronizing signal is transmitted from the display device to the eyeglass device, the eyeglass device generates the individual internal signal in synchronization with the second synchronizing signal. The control portion controls the optical filter portion in synchronization with the individual internal signal. Thus, when the second synchronizing signal is transmitted from the display device to the eyeglass device, the eyeglass device may be controlled on the basis of the second synchronizing signal independently from the calculation result of the display time using the first synchronizing signals.

In the above-mentioned configuration, the reception portion includes a power supply portion, the display device displays the second frame after displaying the first frame, the power supply portion does not supply an electrical power to the reception portion while the second frame is displayed if the reception portion receives the first synchronizing signal while the first frame is displayed, and the power supply portion supplies the electrical power to the reception portion during the display period of the second frame if the reception portion receives the second synchronizing signal while the first frame is displayed.

According to the above-mentioned configuration, the power supply portion interrupts the electrical power supply to the reception portion during the display period of the second frame when the first synchronizing signal is received during the display period of the first frame, which may result in less power consumption. The reception portion does not receive the synchronizing signal during the display period of the second frame when the first synchronizing signals are received during the display period of the first frame, so that the interruption of the electrical power supply during the display period of the second frame may not affect control of the optical filter portion. On the other hand, the power supply portion supplies the electrical power to the reception portion when the second synchronizing signal is received during the display period of the first frame. Therefore the eyeglass device may preferably receive the second synchronizing signal.

In the above-mentioned configuration, the eyeglass device further comprises a power supply portion, the display portion alternately displays the first frame and the second frame, the analysis portion further calculates, based on the reception interval, a predicted period for a next reception of the first synchronizing signal, and the power supply portion does not supply an electrical power to the reception portion except for the predicted period.

According to the above-mentioned configuration, the analysis portion calculates the predicted period for the next reception of the first synchronizing signal based on the reception interval of the first synchronizing signals. The power supply portion supplies the electrical power to the reception portion during the predicted period, so that the eyeglass device may preferably receive the first synchronizing signals. In addition, the power supply portion does not supply the electrical power to the reception portion except for the predicted period, which may results in less power consumption of the eyeglass device.

In the above-mentioned configuration, the optical filter portion includes a left eye filter configured to adjust the amount of the incident light to the left eye and a right eye filter configured to adjust the amount of the incident light to the right eye, the first synchronizing signal include an opening signal used for control to open one of the left eye filter and the right eye filter and a closing signal used for control to close the one of the left eye filter and the right eye filter, the analysis portion calculates, based on a reception interval between the opening signal received ahead and the opening signal subsequently received, a first predicted period for a next reception of the opening signal and a second predicted period for a next reception of the closing signal, and the power supply portion does not supply the electrical power to the reception portion except for the first predicted period and the second predicted period.

According to the above-mentioned configuration, the optical filter portion includes the left eye filter configured to adjust the amount of the incident light to the left eye and the right eye filter configured to adjust the amount of the incident light to the right eye. The first synchronizing signal includes the opening signal used for control to open one of the left eye filter and the right eye filter and a closing signal used for control to close the one of the left eye filter and the right eye filter. The analysis portion calculates the first predicted period for the next reception of the opening signal on the basis of the reception interval between the opening signals of the first synchronizing signals, and the second predicted period for the next reception of the closing signal on the basis of the reception interval between the closing signals of the first synchronizing signals. Thus, the power supply portion supplies the electrical power to the reception portion during the first predicted period and the second predicted period, so that the eyeglass device may preferably receive the next opening signal and the next closing signal. In addition, the power supply portion does not supply the electrical power to the reception portion except for the first predicted period and the second predicted period, which may result in less power consumption by the eyeglass device.

In the above-mentioned configuration, the display portion alternately displays the first frame and the second frame, the transmission portion transmits the synchronizing signal in a first display time, during which the display portion displays a plurality of frame groups containing the first frame and the second frame, except for a second display time following the first display time, and the power supply portion interrupts supplying the electrical power to the reception portion while the frame groups corresponding to the predicted period are displayed except for the predicted period if the reception portion does not receive the first synchronizing signal during the predicted period.

According to the above-mentioned configuration, the display portion alternately displays the first frame and the second frame. The transmission portion transmits the synchronizing signal in the first display time, during which the plurality of the frame groups including the first frame and the subsequent second frame are displayed. The transmission portion, on the other hand, does not transmit the synchronizing signal during the second display time following the first display time. The power supply portion interrupts the electrical power supply to the reception portion during the display time of the first frame corresponding to the first synchronizing signals and the display time of the second frame following the first frame corresponding to the first synchronizing signals except for the predicted periods unless the reception portion receives the first synchronizing signal during the predicted periods, which may result in less power consumption by the eyeglass device.

In the above-mentioned configuration, the second generation portion generates the internal signals in synchronization with the first frame and the second frame based on the reception interval, respectively, and the control portion controls the optical filter portion in synchronization with the internal signals which are synchronous with the first frame and the second frame, respectively, during interruption of supplying the electrical power by the power supply portion.

According to the above-mentioned configuration, the control portion may preferably control the optical filter portion based on the internal signal while the power supply portion interrupts the electrical power supply.

In the above-mentioned configuration, the optical filter portion includes a left eye filter configured to adjust the amount of the incident light to the left eye and the right eye filter configured to adjust the amount of the incident light to the right eye, the first synchronizing signal includes an opening signal used for control to open one of the left eye filter and the right eye filter and a closing signal used for control to close the one of the left eye filter and the right eye filter, the analysis portion calculates a first predicted period for a next reception of the opening signal by the reception portion based on a reception interval between the opening signal received ahead and the opening signal subsequently received, and a second predicted period for a next reception of the closing signal by the reception portion based on a reception interval between the closing signal received ahead and the closing signal subsequently received, and the power supply portion interrupts supplying the electrical power to the reception portion during the display period of the first frame corresponding to the first predicted period and during the display period of the second frame following the first frame corresponding to the first predicted period except for the first predicted period if the reception portion does not receive the opening signal during the first predicted period.

According to the above-mentioned configuration, the optical filter portion includes the left eye filter configured to adjust the amount of the incident light to the left eye and the right eye filter configured to adjust the amount of the incident light to the right eye. The first synchronizing signal includes the opening signal used for control to open one of the left eye filter and the right eye filter and a closing signal used for control to close the one of the left eye filter and the right eye filter. The analysis portion calculates the first predicted period for the next reception of the opening signal based on the reception interval between opening signals, and a second predicted period for the next reception of the closing signal based on the reception interval between the closing signals. The power supply portion supplies the electrical power to the reception portion during the first predicted period and the second predicted period, so that the eyeglass device may preferably receive the next opening signal and the next closing signal. In addition, the power supply portion does not supply the electrical power to the reception portion except for the first predicted period and the second predicted period, which result in less power consumption by the eyeglass device. In addition, the power supply portion interrupts the electrical power supply to the reception portion during the display time of the first frame corresponding to the first predicted period and during the display time of the second frame following the first frame corresponding to the first predicted period if the opening signals are not received during the first predicted period, which may result in less power consumption of the eyeglass device.

In the above-mentioned configuration, a storage portion configured to store a threshold value for the second display period is preferably further provided. The analysis portion determines whether or not interruption of supplying the electrical power to the reception portion exceeds a period defined by the threshold value, and causes the power supply portion to resume supplying the electrical power to the reception portion if the interruption of supplying the electrical power to the reception portion exceeds the period defined by the threshold value.

According to the above-mentioned configuration, the electrical power supply to the reception portion is resumed if the control on the basis of the internal signal exceeds the period defined by a threshold value, which may prevent an increase in a gap between the control on the basis of the internal signal and the display timing of the first frame and the second frame.

A display device according to another aspect of the above-mentioned embodiments is provided with a display portion configured to display a first video image and a second video image in a prescribed order for a prescribed period; a first generation portion configured to generate a synchronizing signal in synchronization with the first video image; and a transmission portion configured to transmit the synchronizing signal, wherein the transmission portion transmits only the synchronizing signal in synchronization with the first video image during at least a portion of the prescribed period.

According to the above-mentioned configuration, the display portion displays the first video image and the second video image in a prescribed order for a prescribed period. The first generation portion generates the synchronizing signal in synchronization with the first video image. The transmission portion transmits only the synchronizing signal in synchronization with the first video image during at least a portion of the prescribed period. Thus, the above-mentioned configuration may not require the generation and the transmission of the synchronizing signal corresponding to the second video image, which may result in a simplified signal processing and less interference between the transmitted synchronizing signals.

In the above-mentioned configuration, the first video image includes a first frame containing one of a left eye frame configured to be viewed by a left eye of a viewer and a right eye frame configured to be viewed by a right eye of the viewer, and the second video image includes a second frame containing another of the left eye frame and the right eye frame.

According to the above-mentioned configuration, the first video image includes the first frame containing one of the left eye frame and the right eye frame while the second video image includes the second frame another of the left eye frame and the right eye frame. Thus, the viewer may three-dimensionally perceive the video image.

An eyeglass device according to yet another aspect of the above-mentioned embodiments is provided with a reception portion configured to receive a synchronizing signal in synchronization with a first video image while the first video image and a second video image are displayed in a prescribed order; a second generation portion configured to generate an internal signal in synchronization with the second video image based on the synchronizing signal; an optical filter portion configured to adjust amounts of incident light to left and right eyes of a viewer, respectively; and a control portion configured to control the optical filter portion based on the internal signal.

According to the above-mentioned configuration, the reception portion receives the synchronizing signal in synchronization with the first video image. The second generation portion generates the internal signal in synchronization with the second video image. The control portion may control the optical filter portion based on the internal signal. Thus, the above-described configuration may not require reception of the synchronizing signal corresponding to the second video image, which may result in a simplified signal processing and less interference of the synchronizing signal to be received.

In the above-mentioned configuration, the first video image includes a first frame containing one of a left eye frame configured to be viewed by the left eye of the viewer and a right eye frame configured to be viewed by the right eye of the viewer, and the second video image includes a second frame containing another of the left eye frame and the right eye frame.

According to the above-mentioned configuration, the first video image includes the first frame containing one of the left eye frame and the right eye frame while the second video image includes a second frame containing another of the left eye frame and the right eye frame. Thus, the viewer may three-dimensionally perceive the video image.

Furthermore, the specific embodiments or examples described in the detailed description of the preferred embodiments of the invention are merely intended to clarify the technical contents of the present invention, and are not to be considered in the narrow sense as being limiting. The prevent invention can be modified in various ways without departing from the spirit of the present invention and within the scope of the appended claims.

What is claimed is:

1. A video system comprising a display device configured to display a video image including a first video image and a second video image and an eyeglass device configured to assist a viewer in viewing the video image, wherein
the display device includes:
a display portion configured to display the first video image and the second video image in a prescribed order;
a first generation portion configured to generate a synchronizing signal in synchronization with the first video image; and
a transmission portion configured to transmit the synchronizing signal to the eyeglass device, and
the eyeglass device includes:
a reception portion configured to receive the synchronizing signal;
a second generation portion configured to generate an internal signal in synchronization with the second video image, based on the synchronizing signal;
an optical filter portion configured to adjust amounts of incident light to a left eye and a right eye, respectively; and
a control portion configured to control the optical filter portion based on the internal signal.

2. The video system according to claim 1, wherein the first video image includes a first frame containing one of a left eye frame configured to be viewed by the left eye of the viewer and a right eye frame configured to be viewed by the right eye of the viewer, and
the second video image includes a second frame containing another of the left eye frame and the right eye frame.

3. The video system according to claim 2, wherein the eyeglass device further includes an analysis portion configured to calculate a display time of the first frame and a display time of the second frame,
the synchronizing signal includes a plurality of first synchronizing signals,
the analysis portion calculates the display time of the first frame and the display time of the second frame based on a reception interval between the first synchronizing signal received ahead and the first synchronizing signal subsequently received under a condition that the display time of the first frame and the display time of the second frame are equivalent, and
the second generation portion generates the internal signal based on the display times calculated by the analysis portion.

4. The video system according to claim 3, wherein the eyeglass device includes a power supply portion, and
the power supply portion supplies an electrical power to the reception portion during the display time of the first frame and interrupts supplying the electrical power to the reception portion during the display time of the second frame.

5. The video system according to claim 4, wherein the power supply portion supplies the electrical power to the reception portion until there are the first synchronizing signal received ahead and the first synchronizing signal subsequently received.

6. The video system according to claim 4, wherein the analysis portion includes a CPU operable at a first clock frequency and a second clock frequency that is lower than the first clock frequency, and
the CPU operates at the first clock frequency while the first frame is displayed and operates at the second clock frequency while the second frame is displayed.

7. The video system according to claim 3, wherein the synchronizing signal includes a second synchronizing signal with a different waveform from that of the first synchronizing signal, and
the second generation portion generates an individual internal signal in synchronization with reception of the second synchronizing signal if the second synchronizing signal is received between the first synchronizing signal received ahead and the first synchronizing signal subsequently received, and
the control portion controls the optical filter portion in synchronization with the individual internal signal.

8. The video system according to claim 7, wherein the reception portion includes a power supply portion,
the display device displays the second frame after displaying the first frame,
the power supply portion does not supply an electrical power to the reception portion while the second frame is displayed if the reception portion receives the first synchronizing signal while the first frame is displayed, and
the power supply portion supplies the electrical power to the reception portion during the display period of the second frame if the reception portion receives the second synchronizing signal while the first frame is displayed.

9. The video system according to claim 3, wherein the eyeglass device further comprises a power supply portion,
the display portion alternately displays the first frame and the second frame,
the analysis portion further calculates, based on the reception interval, a predicted period for a next reception of the first synchronizing signal, and
the power supply portion does not supply an electrical power to the reception portion except for the predicted period.

10. The video system according to claim 9, wherein the optical filter portion includes a left eye filter configured to adjust the amount of the incident light to the left eye and a right eye filter configured to adjust the amount of the incident light to the right eye, the first synchronizing signal include an opening signal used for control to open one of the left eye filter and the right eye filter and a closing signal used for control to close the one of the left eye filter and the right eye filter, the analysis portion calculates, based on a reception interval between the opening signal received ahead and the opening signal subsequently received, a first predicted period for a next reception of the opening signal and a second predicted period for a next reception of the closing signal, and the power supply portion does not supply the electrical power to the reception portion except for the first predicted period and the second predicted period.

11. The video system according to claim 9, wherein the display portion alternately displays the first frame and the second frame, the transmission portion transmits the synchronizing signal in a first display time, during which the display portion displays a plurality of frame groups containing the first frame and the second frame, except for a second display time following the first display time, and the power supply portion interrupts supplying the electrical power to the reception portion while the frame groups corresponding to the predicted period are displayed except for the predicted period if the reception portion does not receive the first synchronizing signal during the predicted period.

12. The video system according to claim 11, wherein the second generation portion generates the internal signals in synchronization with the first frame and the second frame based on the reception interval, respectively, and the control portion controls the optical filter portion in synchronization with the internal signals which are synchronous with the first frame and the second frame, respectively, during interruption of supplying the electrical power by the power supply portion.

13. The video system according to claim 12, wherein the optical filter portion includes a left eye filter configured to adjust the amount of the incident light to the left eye and the right eye filter configured to adjust the amount of the incident light to the right eye, the first synchronizing signal includes an opening signal used for control to open one of the left eye filter and the right eye filter and a closing signal used for control to close the one of the left eye filter and the right eye filter, the analysis portion calculates a first predicted period for a next reception of the opening signal by the reception portion based on a reception interval between the opening signal received ahead and the opening signal subsequently received, and a second predicted period for a next reception of the closing signal by the reception portion based on a reception interval between the closing signal received ahead and the closing signal subsequently received, and the power supply portion interrupts supplying the electrical power to the reception portion during the display period of the first frame corresponding to the first predicted period and during the display period of the second frame following the first frame corresponding to the first predicted period except for the first predicted period if the reception portion does not receive the opening signal during the first predicted period.

14. The video system according to claim 13, further comprising a storage portion configured to store a threshold value for the second display period, and the analysis portion determines whether or not interruption of supplying the electrical power to the reception portion exceeds a period defined by the threshold value, and causes the power supply portion to resume supplying the electrical power to the reception portion if the interruption of supplying the electrical power to the reception portion exceeds the period defined by the threshold value.

15. A display device, comprising:

a display portion configured to display a first video image and a second video image in a prescribed order for a prescribed period;

a first generation portion configured to generate a synchronizing signal in synchronization with the first video image; and a transmission portion configured to transmit the synchronizing signal, wherein the transmission portion transmits only the synchronizing signal in synchronization with the first video image during at least a portion of the prescribed period.

16. The display device according to claim 15, wherein the first video image includes a first frame containing one of a left eye frame configured to be viewed by a left eye of a viewer and a right eye frame configured to be viewed by a right eye of the viewer, and the second video image includes a second frame containing another of the left eye frame and the right eye frame.

17. An eyeglass device, comprising:

a reception portion configured to receive a synchronizing signal in synchronization with a first video image while the first video image and a second video image are displayed in a prescribed order;

a second generation portion configured to generate an internal signal in synchronization with the second video image based on the synchronizing signal;

an optical filter portion configured to adjust amounts of incident light to left and right eyes of a viewer, respectively; and a control portion configured to control the optical filter portion based on the internal signal.

18. The eyeglass device according to claim 17, wherein the first video image includes a first frame containing one of a left eye frame configured to be viewed by the left eye of the viewer and a right eye frame configured to be viewed by the right eye of the viewer, and the second video image includes a second frame containing another of the left eye frame and the right eye frame.

* * * * *